US012629948B2

(12) United States Patent
Takahashi

(10) Patent No.: US 12,629,948 B2
(45) Date of Patent: May 19, 2026

(54) IMAGE FORMING APPARATUS AND METHOD FOR CONTROLLING SAME

(71) Applicant: SCREEN Holdings Co., Ltd., Kyoto (JP)

(72) Inventor: Susumu Takahashi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 344 days.

(21) Appl. No.: 18/291,899

(22) PCT Filed: Jul. 13, 2022

(86) PCT No.: PCT/JP2022/027525
§ 371 (c)(1),
(2) Date: Jul. 30, 2024

(87) PCT Pub. No.: WO2023/008194
PCT Pub. Date: Feb. 2, 2023

(65) Prior Publication Data
US 2025/0128528 A1 Apr. 24, 2025

(30) Foreign Application Priority Data
Jul. 28, 2021 (JP) ................................ 2021-123112

(51) Int. Cl.
*B41J 15/04* (2006.01)
*B41J 2/175* (2006.01)
(Continued)

(52) U.S. Cl.
CPC ............... *B41J 15/04* (2013.01); *B41J 2/175* (2013.01); *B41J 11/00214* (2021.01); *B41J 29/00* (2013.01)

(58) Field of Classification Search
CPC ..... B41J 15/04; B41J 2/175; B41J 2/01; B41J 11/00214; B41J 29/00; B41J 11/00212;
(Continued)

(56) References Cited

U.S. PATENT DOCUMENTS

2015/0251451 A1* 9/2015 Hamazaki .......... B41J 11/00212 347/102
2019/0105684 A1 4/2019 Veis
2021/0354484 A1* 11/2021 Suzuki .................. B41J 15/005

FOREIGN PATENT DOCUMENTS

EP 3456543 A1 3/2019
JP H10-305953 A 11/1998
(Continued)

OTHER PUBLICATIONS

International Search Report issued in International Application No. PCT/JP2022/027525, dated Sep. 27, 2022 w/English Translation.

*Primary Examiner* — Kristal Feggins
(74) *Attorney, Agent, or Firm* — Rimon P.C.

(57) ABSTRACT

Provided is an inkjet printing apparatus capable of changing a conveyance speed of printing paper such that deterioration in print quality is suppressed as much as possible when the conveyance speed needs to be changed. There is provided a speed change condition determination unit that, when it is necessary to change the conveyance speed of printing paper, determines a speed change rate (amount of change in the conveyance speed per unit time) and a conveyance speed after speed change in consideration of at least one of a supply state of ink from an ink supply unit to a printing unit and a state of a drying unit. A conveyance control unit controls an operation of a conveyance unit in accordance with the speed change rate and the conveyance speed after speed change determined by the speed change condition determination unit.

19 Claims, 16 Drawing Sheets

(51) Int. Cl.
*B41J 11/00* (2006.01)
*B41J 29/00* (2006.01)

(58) Field of Classification Search
CPC ........ B41J 11/42; B41J 2/04501; B41J 29/38; B41J 29/387; B41J 29/393; B41J 2/04528; B41J 2/04531; B41J 2/04535; B41J 2/0454; B41J 2/04563; B41J 2/04571; B41J 2/04596; B41J 2/04598; B41J 2/17596; B41J 2/195
See application file for complete search history.

(56) References Cited

FOREIGN PATENT DOCUMENTS

| | | | | |
|---|---|---|---|---|
| JP | 2008-168502 A | | 7/2008 | |
| JP | 2010-76404 A | | 4/2010 | |
| JP | 2015-16623 A | | 1/2015 | |
| JP | 2015-16637 A | | 1/2015 | |
| JP | 2018134853 | * | 8/2018 | ................ B41J 2/01 |
| JP | 2019-051651 A | | 4/2019 | |

* cited by examiner

65

| | PRINT CONTINUATION MODE | HIGH QUALITY MODE | DRYING PERFORMANCE MODE |
|---|---|---|---|
| CONSTRAINTS OF FRONT AND REAR DEVICES | 5 | 3 | 3 |
| CONVEYANCE CONTROL | 3 | 4 | 3 |
| DRYING CONTROL | 2 | 4 | 5 |
| INK SUPPLY CONTROL | 2 | 4 | 3 |
| PRINTING CONTROL | 2 | 5 | 3 |

Fig.19

| | SCORE | | PRINT CONTINUATION MODE | HIGH QUALITY MODE | DRYING PERFORMANCE MODE |
|---|---|---|---|---|---|
| | SYMBOL | NUMERICAL VALUE | | | |
| CONSTRAINTS OF FRONT AND REAR DEVICES | P 1 | 1 0 | 5 0 | 3 0 | 3 0 |
| CONVEYANCE CONTROL | P 1 | 1 0 | 3 0 | 4 0 | 3 0 |
| DRYING CONTROL | P 2 | 5 | 1 0 | 2 0 | 2 5 |
| INK SUPPLY CONTROL | P 3 | 0 | 0 | 0 | 0 |
| PRINTING CONTROL | P 2 | 1 0 | 2 0 | 5 0 | 3 0 |
| TOTAL VALUE | | | 1 1 0 | 1 4 0 | 1 1 5 |

87

IMAGE FORMING APPARATUS AND METHOD FOR CONTROLLING SAME

TECHNICAL FIELD

The present invention relates to an image forming apparatus and a method for controlling the image forming apparatus, and more particularly to an image forming apparatus that forms an image on a surface of a base material (printing paper or the like) having a long belt shape by ejecting ink onto the base material and a method for controlling the image forming apparatus.

BACKGROUND ART

As one of image forming apparatuses that form an image on a surface of a base material, an inkjet printing apparatus that performs printing by ejecting ink onto a base material by heat or pressure is known. For example, in an inkjet printing apparatus used for bookbinding, a printing paper having a long belt shape (continuous paper) called a roll paper is typically employed as a base material. The printing paper having a long belt shape is conveyed by a conveyance unit (conveyance mechanism) including a drive roller and the like, and printing is performed by ejecting ink from a print head onto the printing paper being conveyed.

When printing is performed on the printing paper having a long belt shape, first, a conveyance speed of the printing paper (distance that the printing paper is conveyed per unit time by the conveyance unit) gradually increases from a state where the apparatus is stopped. That is, the conveyance speed is accelerated at the start of printing. Then, when the conveyance speed reaches a predetermined speed, printing is performed while the conveyance speed is maintained at a constant speed. Thereafter, at the end of printing, the conveyance speed gradually decreases from the predetermined speed until the apparatus stops. That is, the conveyance speed is decelerated at the end of printing. Note that during the acceleration of the conveyance speed and the deceleration of the conveyance speed, printing may be performed or printing may not be performed.

Meanwhile, there is an inkjet printing apparatus in which a plurality of speeds is prepared as a settable conveyance speed (printing speed). In general, in such an inkjet printing apparatus, printing is normally performed in a state where the conveyance speed is set to the maximum speed among the plurality of prepared speeds. However, during a period in which printing is performed in a state in which the conveyance speed is set to the maximum speed, deceleration of the conveyance speed may be required for various reasons. The need for the deceleration of the conveyance speed occurs, for example, in the following cases (1) to (5).

(1) A case where in a configuration in which processes from printing to bookbinding are made in-line, processing in a post-processing machine is not in time for a supply speed of printed printing paper, and a free space of a buffer provided between the printing apparatus and the post-processing machine is almost exhausted.

(2) A case where work called "splice" of joining two roll papers is performed in an unwinding device (paper feeding unit) that feeds the roll paper to a printing mechanism.

(3) A case where transfer of print data from a RIP device (rasterization processing device) to an inkjet printing apparatus or transfer of print data from a controller (print control device) to a printing unit is not in time for printing speed.

(4) A case where ink supply from an ink tank to a printing unit is not in time for printing speed.

(5) A case where drying control in a drying unit for printed printing paper is not in time for conveyance speed.

Regarding the above (1), the buffer size and the work time required for recovery are constraints. Regarding the above (2), the work time of the splice is a constraint. Regarding the above (3), the time required for preparing data, the data processing capability of hardware, and the data transfer rate are constraints. Regarding the above (4), the maximum ink supply amount and the switching time of the ink tank are constraints. Regarding the above (5), the time required to switch the drying control and the time required to change a temperature in the drying unit are constraints.

For example, in an inkjet printing apparatus in which "high speed" and "low speed" are prepared as settable conveyance speeds, when the conveyance speed needs to be decelerated during a period in which printing is performed with the conveyance speed set to the high speed, the conveyance speed is changed from the high speed to the low speed. Then, printing is performed while the conveyance speed is maintained at the low speed. Thereafter, when the state in which printing must be performed with the conveyance speed set to the low speed is resolved, the conveyance speed is changed from the low speed to the high speed, and printing is performed in a state where the conveyance speed is maintained at the high speed. Note that in the following description, printing in a state where the conveyance speed is set to the high speed is simply referred to as "high-speed printing", and printing in a state where the conveyance speed is set to the low speed is simply referred to as "low-speed printing".

Note that the following prior art documents are known in connection with the present invention. Japanese Laid-Open Patent Publication No. 2019-51651 discloses an invention of a printing apparatus in which the acceleration of a conveyance speed is varied depending on the ease of expansion and contraction of a base material so as to suppress tension fluctuation of the base material and improve the print quality. Furthermore, Japanese Laid-Open Patent Publication No. H10-305953 describes that regarding an automatic paper joining device, a braking force at the time of sudden deceleration or emergency stop is made different depending on the density of paper.

PRIOR ART DOCUMENTS

Patent Documents

[Patent Document 1] Japanese Laid-Open Patent Publication No. 2019-51651

[Patent Document 2] Japanese Laid-Open Patent Publication No. H10-305953

SUMMARY OF THE INVENTION

Problems to be Solved by the Invention

However, sufficient quality may not be obtained for low-speed printing or printing when acceleration/deceleration of the conveyance speed is performed. This will be described with reference to FIG. 22. FIG. 22 illustrates an example of a relationship between a conveyance speed and a timing at which each page is printed on each of a front surface and a back surface in an inkjet printing apparatus including a printing machine PR1 for front surface printing and a printing machine PR2 for back surface printing. Note that the numbers from 1 to 17 in the columns denoted by reference characters PR1 and PR2 represent page numbers.

In a period T91, printing is performed in a state where the conveyance speed is gradually accelerated. During a period T92, high-speed printing is performed. In a period T93, printing is performed in a state where the conveyance speed is gradually decelerated. During a period T94, low-speed printing is performed. A printed matter obtained by printing in the period T92 is of high quality. Regarding the printed matter obtained by the printing in the period T91, the period T93, and the period T94, the quality is not as good as that of the printed matter obtained by the printing in the period T92. The quality of the printed matter obtained by printing in the period T91 depends on an acceleration rate, and in general, the higher the acceleration rate, the lower the quality. The quality of the printed matter obtained by printing in the period T93 depends on a deceleration rate, and in general, the higher the deceleration rate, the lower the quality. The quality of the printed matter obtained by printing in the period T94 depends on a conveyance speed, and in general, the lower the conveyance speed, the lower the quality.

By the way, regarding printing, users have various demands. For example, there are demands for not stopping printing halfway because, when printing is stopped, waste paper is generated or an operation rate of the apparatus is lowered due to the necessity of readjustment of the post-processing machine, performing printing at a high speed within a possible range in order to shorten the printing time and improve the operation rate of the apparatus, and improving the quality of a printed matter as much as possible. Note that, regarding the various demands, even for the same user, the priority may change depending on the business, for example.

Regarding the acceleration/deceleration of the conveyance speed, there are limitations on the acceleration/deceleration rate and the conveyance speed applicable to the inkjet printing apparatus. This will be described below. There is a resonant speed range regarding a motor that controls the conveyance of the printing paper. Therefore, the conveyance speed cannot be freely selected, and it is usually necessary to select the conveyance speed to be applied from the speeds prepared in advance. Furthermore, in a case where the conveyance speed is remarkably low or in a case where the conveyance speed is rapidly changed, the conveyance of the printing paper becomes unstable. As above, there are constraints on the minimum conveyance speed, the maximum acceleration rate, and the maximum deceleration rate from the viewpoint of ensuring the stability of the conveyance of the printing paper. Furthermore, a heater in a drying unit that dries the printed printing paper cannot rapidly increase or decrease the temperature. Therefore, when the acceleration/deceleration rate is too high, the control of the temperature in the drying unit cannot follow the change in the conveyance speed. Moreover, in a case where inks of a plurality of colors are used, when the acceleration/deceleration rate is too high, landing deviation of the occurs, inks and thus superimposition of the plurality of colors is not suitably performed. Furthermore, depending on the acceleration/deceleration rate and the conveyance speed to be applied, the ink supply ability from an ink tank to a printing unit may be insufficient or the ink supply may vary.

In a case where it is necessary to change (accelerate or decelerate) the conveyance speed during printing, it is preferable to determine the acceleration/deceleration rate to be applied and the conveyance speed after speed change in such a way that the user's demands are satisfied while considering limitations on the acceleration/deceleration rate and the conveyance speed. However, according to the conventional inkjet printing apparatus, for example, when there is a need for deceleration, the print quality may be greatly deteriorated by increasing the deceleration rate more than necessary or decreasing the conveyance speed more than necessary.

Note that, according to the invention disclosed in Japanese Laid-Open Patent Publication No. 2019-51651, the tension fluctuation of the base material is merely suppressed, and thus the deterioration of the print quality is not sufficiently suppressed when the conveyance speed is changed. Furthermore, Japanese Laid-Open Patent Publication No. H10-305953 does not describe contents related to the quality at all.

Therefore, an object of the present invention is to realize an inkjet printing apparatus (image forming apparatus) capable of changing a conveyance speed of printing paper in such a way that deterioration in print quality is suppressed as much as possible when the conveyance speed needs to be changed.

Means for Solving the Problems

A first aspect of the present invention is directed to an image forming apparatus including a conveyance unit configured to convey a print medium having a long belt shape, and a printing unit configured to form an image by ejecting ink onto the print medium being conveyed by the conveyance unit, the image forming apparatus including:

a conveyance control unit configured to control an operation of the conveyance unit;

an ink supply unit configured to supply ink to the printing unit;

a drying unit configured to dry a printed print medium on which an image is formed by the printing unit; and a speed change condition determination unit configured to, when it is necessary to change a conveyance speed, determine a speed change condition including a speed change rate and a conveyance speed after speed change in consideration of at least one of a supply state of ink from the ink supply unit to the printing unit and a state of the drying unit, the conveyance speed being a distance that the print medium is conveyed per unit time by the conveyance unit, the speed change rate being an amount of change in the conveyance speed per unit time, wherein the conveyance control unit controls an operation of the conveyance unit in accordance with the speed change condition determined by the speed change condition determination unit.

According to a second aspect of the present invention, in the first aspect of the present invention, the speed change condition determination unit considers the supply state of ink from the ink supply unit to the printing unit when determining the speed change rate and the conveyance speed after speed change.

According to a third aspect of the present invention, in the second aspect of the present invention, the image forming apparatus further includes an ink supply control unit configured to control an ink supply rate indicating a supply degree of ink from the ink supply unit to the printing unit, and when the ink supply rate is within a predetermined range, the speed change condition determination unit determines the speed change rate to be a lower value as the ink supply rate is higher.

According to a fourth aspect of the present invention, in the third aspect of the present invention, a second table storing a relationship between a combination of the ink supply rate and the speed change rate and a score is prepared in advance, and the speed change condition determination unit determines the speed change rate based on the second table.

According to a fifth aspect of the present invention, in the first aspect of the present invention, the speed change condition determination unit considers the state of the drying unit when determining the speed change rate and the conveyance speed after speed change.

According to a sixth aspect of the present invention, in the fifth aspect of the present invention, the drying unit includes a plurality of light sources that generate heat when turned on, and when a turn-on rate of the plurality of light sources is within a predetermined range, the speed change condition determination unit determines the speed change rate to be a lower value as the turn-on rate of the plurality of light sources is higher.

According to a seventh aspect of the present invention, in the sixth aspect of the present invention, a first table storing between a combination of the turn-on rate of the plurality of light sources and the speed change rate and a score is prepared in advance, and the speed change condition determination unit determines the speed change rate based on the first table.

According to an eighth aspect of the present invention, in the first aspect of the present invention, the speed change condition determination unit considers both the supply state of ink from the ink supply unit to the printing unit and the state of the drying unit when determining the speed change rate and the conveyance speed after speed change.

According to a ninth aspect of the present invention, in the eighth aspect of the present invention, a high quality mode in which quality of the image on the printed print medium is emphasized and a drying performance mode in which a dry state of the printed print medium is emphasized are prepared, when the high quality mode is set, the speed change condition determination unit determines the speed change rate and the conveyance speed after speed change in consideration of the supply state of ink from the ink supply unit to the printing unit more preferentially than the state of the drying unit, and when the drying performance mode is set, the speed change condition determination unit determines the speed change rate and the conveyance speed after speed change in consideration of the state of the drying unit more preferentially than the supply state of ink from the ink supply unit to the printing unit.

According to a tenth aspect of the present invention, in the first aspect of the present invention, the image forming apparatus further includes a learning unit trained by machine learning using the speed change condition as input data, and when it is necessary to change the conveyance speed, the speed change condition determination unit gives a plurality of sets of input data representing the speed change condition to the learning unit, and determines a speed change condition corresponding to input data when output data closest to a target value is outputted from the learning unit as a speed change condition to be actually applied.

According to an eleventh aspect of the present invention, in the tenth aspect of the present invention, a temperature of the drying unit is adopted as the target value, the input data further includes a temperature of the drying unit before speed change, and the learning unit outputs a predicted temperature of the drying unit after speed change as the output data.

According to a twelfth aspect of the present invention, in the first aspect of the present invention, the speed change condition determination unit further considers a constraint based on an operation of at least one of a conveyance source of the print medium and a conveyance destination of the printed print medium when determining the speed change rate and the conveyance speed after speed change.

According to a thirteenth aspect of the present invention, in the first aspect of the present invention, the printing unit includes a print head that ejects ink onto the print medium, and the speed change condition determination unit further considers an ejection state of ink from the print head to the print medium when determining the speed change rate and the conveyance speed after speed change.

According to a fourteenth aspect of the present invention, in the first aspect of the present invention, the image forming apparatus is configured to allow setting of one or a plurality of modes, and the speed change condition determination unit changes the speed change rate and the conveyance speed after speed change depending on the mode being set.

According to a fifteenth aspect of the present invention, in the first aspect of the present invention, a high speed, a first low speed, and a second low speed that is a speed lower than the first low speed are prepared as a conveyance speed when the conveyance unit conveys the print medium at a constant speed, and the conveyance control unit is configured to be capable of performing deceleration from the high speed to the second low speed separately for a first deceleration from the high speed to the first low speed and a second deceleration from the first low speed to the second low speed.

According to a sixteenth aspect of the present invention, in the fifteenth aspect of the present invention, the speed change condition determination unit determines a speed change rate for the second deceleration to be a value higher than a speed change rate for the first deceleration.

According to a seventeenth aspect of the present invention, in the fifteenth aspect of the present invention, the conveyance control unit is configured to be capable of performing acceleration from the first low speed to the high speed without performing deceleration from the first low speed to the second low speed after the first deceleration.

An eighteenth aspect of the present invention is directed to an image forming apparatus including a conveyance unit configured to convey a print medium having a long belt shape, and a printing unit configured to form an image by ejecting photocurable ink onto the print medium being conveyed by the conveyance unit, the image forming apparatus including:

a conveyance control unit configured to control an operation of the conveyance unit;

an ink supply unit configured to supply photocurable ink to the printing unit;

an ultraviolet irradiation unit configured to, by ultraviolet irradiation, cure photocurable ink on a printed print medium on which an image is formed by the printing unit; and a speed change condition determination unit configured to, when it is necessary to change a conveyance speed, determine a speed change condition including a speed change rate and a conveyance speed after speed change in consideration of at least one of a supply state of photocurable ink from the ink supply unit to the printing unit and a state of the ultraviolet irradiation unit, the conveyance speed being a distance that the print medium is conveyed per unit time by the conveyance unit, the speed change rate being an amount of change in the conveyance speed per unit time, wherein the conveyance control unit controls an operation of the conveyance unit in accordance with the speed change condition determined by the speed d change condition determination unit.

A nineteenth aspect of the present invention is directed to a method for controlling an image forming apparatus including a conveyance unit configured to convey a print medium having a long belt shape, a printing unit configured to form an image by ejecting ink onto the print medium being conveyed by the conveyance unit, an ink supply unit configured to supply ink to the printing unit, and a drying unit configured to dry a printed print medium on which an image is formed by the printing unit, the method including:

a speed change condition determination step of, when it is necessary to change a conveyance speed, determining a speed change condition including a speed change rate and a conveyance speed after speed change in consideration of at least one of a supply state of ink from the ink supply unit to the printing unit and a state of the drying unit; the conveyance speed being a distance that the print medium is conveyed per unit time by the conveyance unit, the speed change rate being an amount of change in the conveyance speed per unit time, and a conveyance control step of controlling an operation of the conveyance unit in accordance with the speed change condition determined in the speed change condition determination step.

A twentieth aspect of the present invention is directed to a method for controlling an image forming apparatus including a conveyance unit configured to convey a print medium having a long belt shape, a printing unit configured to form an image by ejecting photocurable ink onto the print medium being conveyed by the conveyance unit, an ink supply unit configured to supply photocurable ink to the printing unit, and an ultraviolet irradiation unit configured to, by ultraviolet irradiation, cure photocurable ink on a printed print medium on which an image is formed by the printing unit, the method including:

a speed change condition determination step of, when it is necessary to change a conveyance speed, determining a speed change condition including a speed change rate and a conveyance speed after speed change in consideration of at least one of a supply state of photocurable ink from the ink supply unit to the printing unit and a state of the ultraviolet irradiation unit; the conveyance speed being a distance that the print medium is conveyed per unit time by the conveyance unit, the speed change rate being an amount of change in the conveyance speed per unit time, and a conveyance control step of controlling an operation of the conveyance unit in accordance with the speed change condition determined in the speed change condition determination step.

Effects of the Invention

According to the first aspect of the present invention, the image forming apparatus is provided with a speed change condition determination unit configured to, when it is necessary to change a conveyance speed of the print medium, determine a speed change rate (a distance that the print medium is conveyed per unit time by the conveyance unit) and a conveyance speed after speed change. The speed change condition determination unit determines the speed change rate and the conveyance speed after speed change in consideration of at least one of the supply state of ink from the ink supply unit to the printing unit and the state of the drying unit. This suppresses deterioration in print quality. As above, an image forming apparatus capable of changing the conveyance speed of the print medium in such a way that deterioration in print quality is suppressed as much as possible when it is necessary to change the conveyance speed of the print medium is realized.

According to the second aspect of the present invention, since the supply state of ink from the ink supply unit to the printing unit is taken into consideration when the speed change rate and the conveyance speed after speed change are determined, the occurrence of variations related to the supply of ink is suppressed even if the conveyance speed is changed.

According to the third aspect of the present invention, it is possible to minimize the influence of the change in the conveyance speed on the supply state of ink to the printing unit.

According to the fourth aspect of the present invention, it is possible to more effectively suppress the occurrence of variations related to the supply of ink.

According to the fifth aspect of the present invention, since the state of the drying unit is taken into consideration when the speed change rate and the conveyance speed after speed change are determined, the occurrence of uneven drying caused by the fact that the control of a temperature in the drying unit cannot follow the change in the conveyance speed is suppressed even if the conveyance speed is changed.

According to the sixth aspect of the present invention, it is possible to minimize the influence of the change in the conveyance speed on the dry state of the printed print medium.

According to the seventh aspect of the present invention, the occurrence of uneven drying can be more effectively suppressed.

According to the eighth aspect of the present invention, since the supply state of ink from the ink supply unit to the printing unit and the state of the drying unit are taken into consideration when the speed change rate and the conveyance speed after speed change are determined, it is possible to, when the conveyance speed is changed, suppress the occurrence of variations related to the supply of ink and the occurrence of uneven drying caused by the fact that the control of the temperature in the drying unit cannot follow the change in the conveyance speed.

According to the ninth aspect of the present invention, the occurrence of variations related to the supply of ink is effectively suppressed when image quality is emphasized, and the occurrence of uneven drying is effectively suppressed when the dry state is emphasized.

According to the tenth aspect of the present invention, since machine learning is used when the speed change condition is determined, it is possible to determine the speed change condition in consideration of a past state change when the conveyance speed is changed so as to obtain a target control state.

According to the eleventh aspect of the present invention, the same effect as that of the tenth aspect of the present invention can be obtained.

According to the twelfth aspect of the present invention, since the constraint based on the operation of front and rear devices of the image forming apparatus is taken into consideration when the speed change rate and the conveyance speed after speed change are determined, it is possible to suppress the stop of printing due to the occurrence of an error in the front and rear devices, for example.

According to the thirteenth aspect of the present invention, since the ejection state of ink is taken into consideration when the speed change rate and the conveyance speed after speed change are determined, it is possible to more effectively suppress deterioration in print quality due to a change in the conveyance speed.

According to the fourteenth aspect of the present invention, the speed change condition when the conveyance speed is changed can be changed in accordance with a demand of a user.

According to the fifteenth aspect of the present invention, since the conveyance speed can be more flexibly changed, deterioration in print quality due to the change in the conveyance speed is effectively suppressed.

According to the sixteenth aspect of the present invention, for example, the conveyance speed can be reduced in such a way that excessive drying of the printed print medium does not occur.

According to the seventeenth aspect of the present invention, the conveyance speed is suppressed from decreasing more than necessary, and the printing time can be shortened.

According to the eighteenth aspect of the present invention, the same effect as that of the first aspect of the present invention can be obtained.

According to the nineteenth aspect of the present invention, the same effect as that of the first aspect of the present invention can be obtained.

According to the twentieth aspect of the present invention, the same effect as that of the first aspect of the present invention can be obtained.

BRIEF DESCRIPTION OF THE DRAWINGS

FIG. 19 is a diagram for explaining priority mode determination processing in a fourth modification of the embodiment.

MODE FOR CARRYING OUT THE INVENTION

Hereinafter, an embodiment of the present invention will be described with reference to the accompanying drawings.

<1. Overall Configuration>

Figure 1:
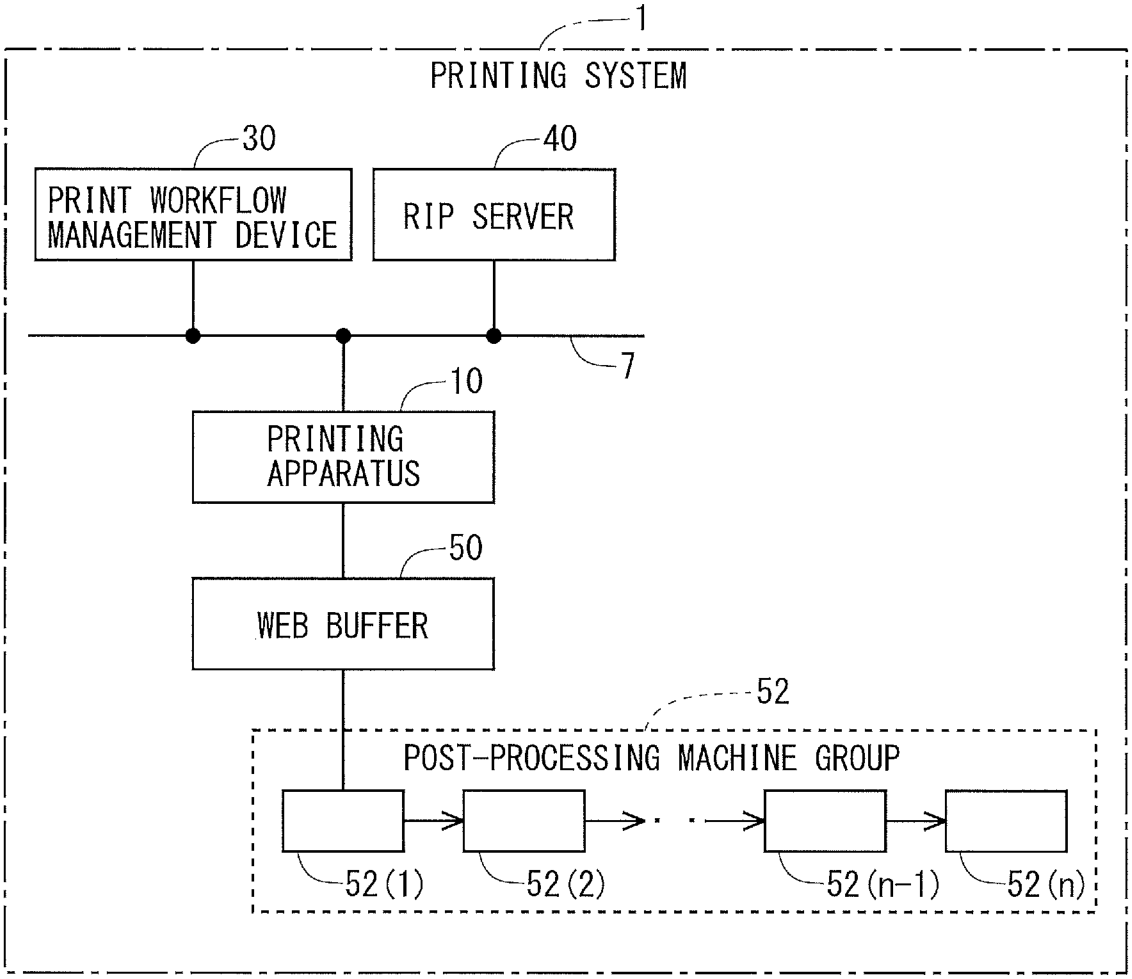
FIG. 1 is an overall configuration diagram of a printing system according to an embodiment of the present invention.

FIG. 1 is a block diagram illustrating an overall configuration of a printing system 1 according to an embodiment of the present invention. The printing system 1 includes a printing apparatus 10, a print workflow management device 30, an RIP server 40, a web buffer 50, and a post-processing machine group 52.

The printing apparatus 10 is an image forming apparatus that forms an image by ejecting ink onto printing paper as a print medium. The printing apparatus 10 generally includes a printing machine body and a print control device that is a controller of the printing machine body. The printing apparatus 10 according to the present embodiment is an inkjet printing apparatus that performs printing (continuous printing) on roll paper that is continuous paper.

The print workflow management device 30 performs management of a series of processing for performing printing in the printing system 1 (that is, performing management of a print workflow). Note that in this regard, a computer such as a personal computer in which application software (print workflow management system) for managing the print workflow is installed functions as the print workflow management device 30.

The RIP server 40 performs RIP processing (rasterization processing) on submitted data (data in a vector format) such as a PDF file. Print data generated by the RIP processing is sent from the RIP server 40 to the printing apparatus 10.

As illustrated in FIG. 1, the web buffer 50 is provided between the printing apparatus 10 and the post-processing machine group 52. The printed printing paper is supplied from the printing apparatus 10 to the post-processing machine group 52 via the web buffer 50. The web buffer 50 temporarily holds the printed printing paper as appropriate in order to absorb a difference in processing speed between the printing apparatus 10 and the post-processing machine group 52.

The post-processing machine group 52 includes n (n is a natural number) post-processing machines 52(1) to 52(*n*) for performing post-processing on the printed printing paper. As an example, the post-processing machine group 52 includes a sheet cutter (cutting machine) that cuts the continuous paper after printing by the printing apparatus 10 into a designated size, a folding machine that creates a signature from the printing paper cut into the designated size, a gathering machine that gathers a plurality of the signatures, a binding machine that performs binding processing on a signature group in a gathered state, and a three-way cutting machine that performs finish cutting in three directions (top, bottom, small opening) of a book.

The printing apparatus 10, the print workflow management device 30, and the RIP server 40 are communicably connected by a network 7 such as a LAN. Submitted data that is data to be printed is sent from a client computer (not illustrated) or the like via the network 7.

Meanwhile, in the printing system 1, in a period during which high-speed printing is performed, for example, an instruction (signal) for requesting deceleration may be transmitted from the web buffer 50 or the post-processing machine constituting the post-processing machine group 52 to the printing apparatus 10. When such an instruction is transmitted, the conveyance speed of the printing paper is decelerated, and low-speed printing is performed. Thereafter, when the state in which printing must be performed with the conveyance speed set to a low speed is resolved, the conveyance speed is accelerated, and high-speed printing is performed. In this manner, the printing apparatus 10 according to the present embodiment performs variable speed printing capable of changing the conveyance speed of the printing paper during the printing operation.

<2. Configuration of Printing Apparatus>

Figure 2:
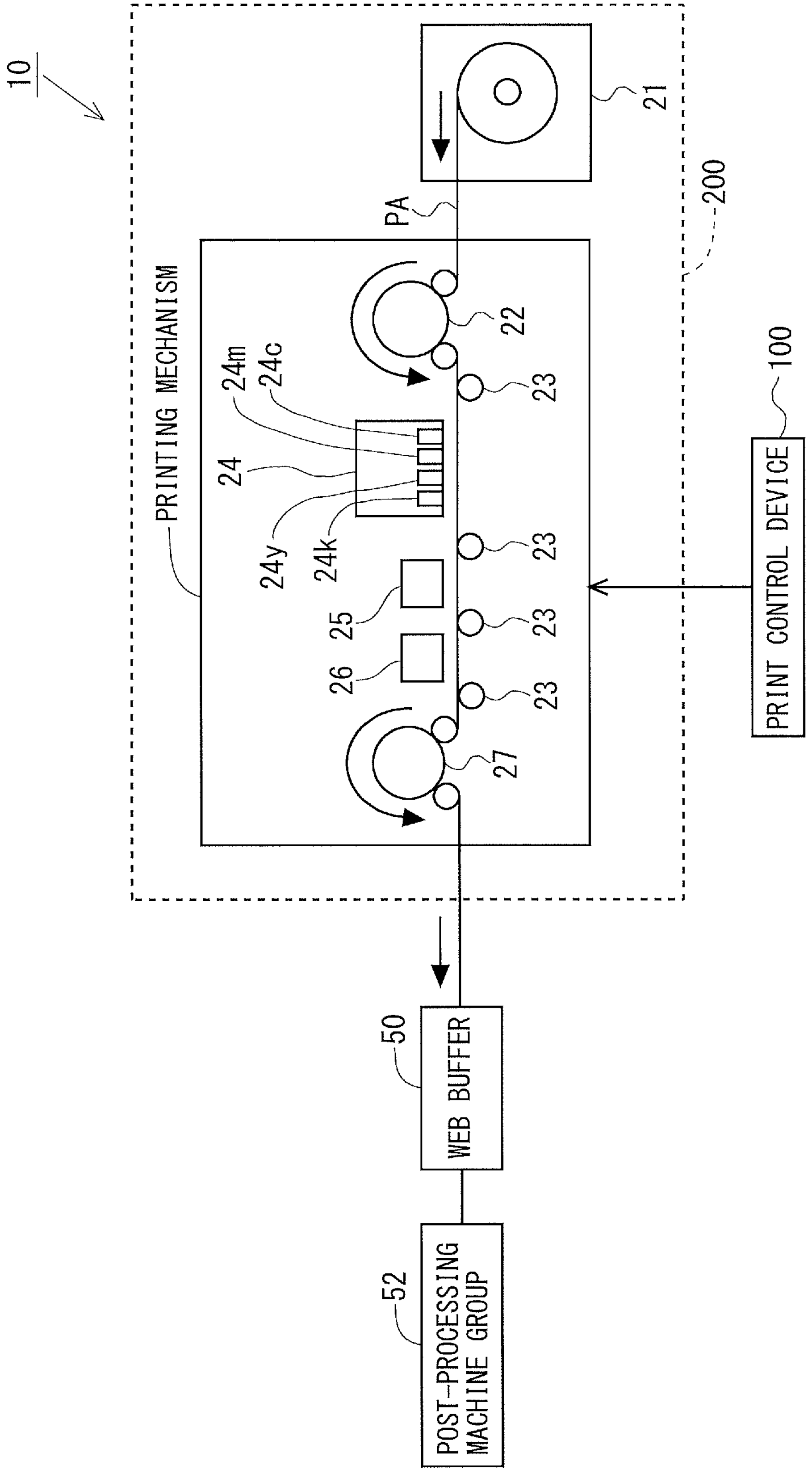
FIG. 2 is a schematic diagram illustrating a configuration example of a printing apparatus in the embodiment.

FIG. 2 is a schematic diagram illustrating a configuration example of the printing apparatus 10. As described above, the printing apparatus 10 includes the printing machine body 200 and the print control device 100 that is a controller of the printing machine body.

The printing machine body 200 includes a paper feeding unit 21 that supplies printing paper (here, roll paper) PA, a first drive roller 22 that conveys the printing paper PA to the inside of a printing mechanism, a plurality of support rollers 23 that conveys the printing paper PA inside the printing mechanism, a printing unit 24 that performs printing by ejecting ink (aqueous ink) onto the printing paper PA, a drying unit 25 that dries the printing paper PA after printing, an inspection unit 26 that inspects a state of printing on the printing paper PA, and a second drive roller 27 that outputs the printing paper PA from the inside of the printing mechanism. Note that although not illustrated in FIG. 2, an ink supply unit that includes an ink tank for storing ink and supplies ink from the ink tank to the printing unit 24 is also provided inside the printing machine body 200.

For example, as illustrated in FIG. 2, the printing unit 24 includes a C inkjet head row 24*c*, an M inkjet head row 24*m*, a Y inkjet head row 24*y*, and a K inkjet head row 24*k* that respectively eject C (cyan), M (magenta), Y (yellow), and K (black) inks. Each inkjet head row includes a plurality of inkjet heads (print heads) arranged in a staggered manner. Each inkjet head includes a large number of nozzles that eject ink.

The print control device 100 controls an operation of the printing machine body 200 having the above configuration. When a printout instruction command is given to the print control device 100, the print control device 100 controls the operation of the printing machine body 200 so that the printing paper PA is conveyed from the paper feeding unit 21 to the inside of the printing mechanism. Then, in the process of conveying the printing paper PA, first, printing is performed on the printing paper PA by the printing unit 24, next, the printing paper PA is dried by the drying unit 25, and finally, a printing state is inspected by the inspection unit 26.

Note that here, the configuration of the inkjet printing apparatus that performs color printing has been exemplified, but the present invention can also be applied to a case where an inkjet printing apparatus that performs monochrome printing is adopted. Furthermore, here, the configuration of the inkjet printing apparatus that performs printing only on one surface of the printing paper PA has been exemplified, but the present invention can also be applied to a case where an inkjet printing apparatus that includes a printing mechanism for front surface printing and a printing mechanism for back surface printing and performs printing on both surfaces of the printing paper PA is adopted.

<3. Hardware Configuration of Print Control Device>

Figure 3:
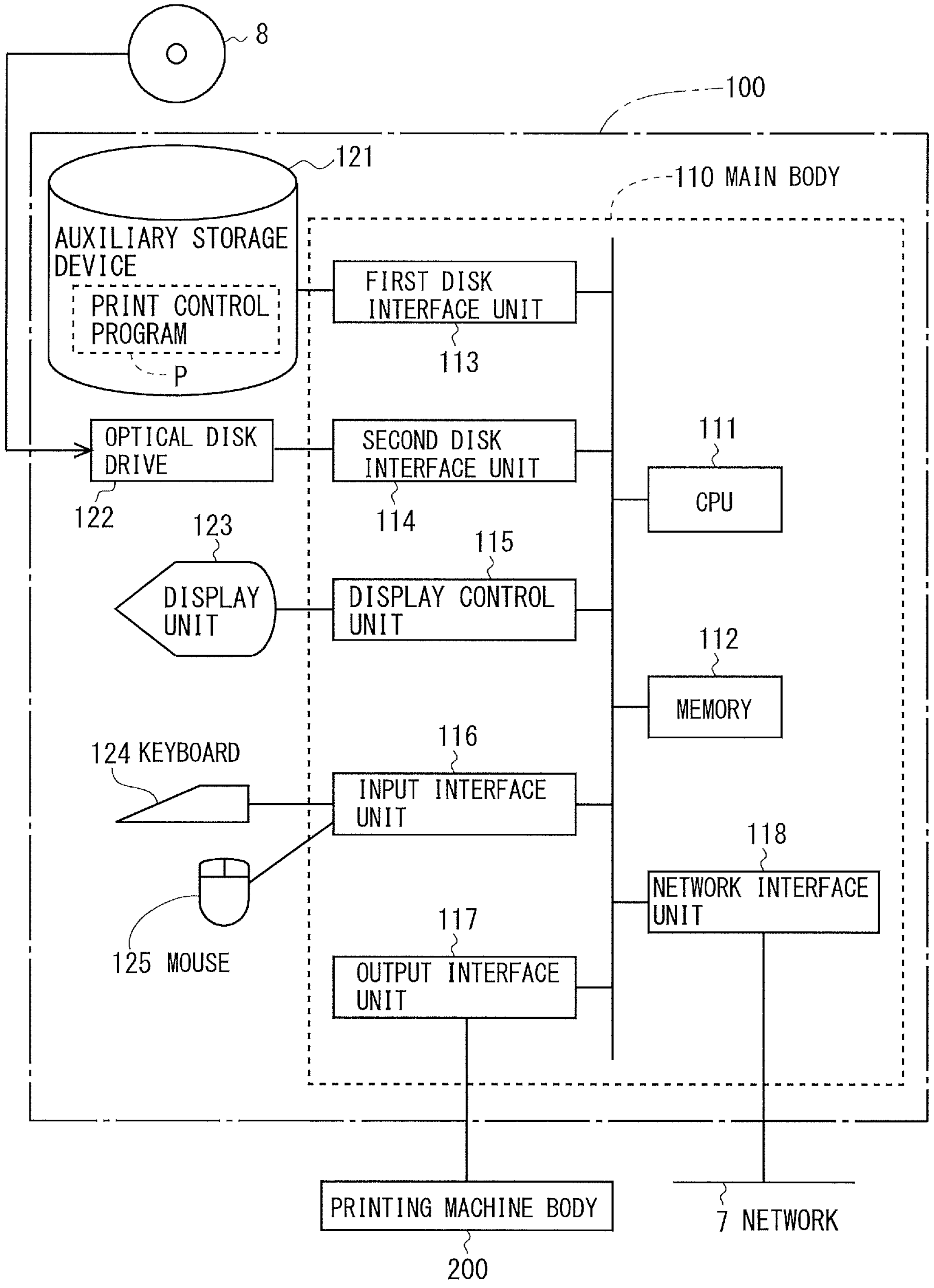
FIG. 3 is a block diagram illustrating a hardware configuration of a print control device in the embodiment.

FIG. 3 is a block diagram illustrating a hardware configuration of the print control device 100. As illustrated in FIG. 3, the print control device 100 includes a main body 110, an auxiliary storage device 121, an optical disk drive 122, a display unit 123, a keyboard 124, a mouse 125, and the like. The main body 110 includes a CPU 111, a memory 112, a first disk interface unit 113, a second disk interface unit 114, a display control unit 115, an input interface unit 116, an output interface unit 117, and a network interface unit 118. The CPU 111, the memory 112, the first disk interface unit 113, the second disk interface unit 114, the display control unit 115, the input interface unit 116, the output interface unit 117, and the network interface unit 118 are connected to each other via a system bus. The auxiliary storage device 121 is connected to the first disk interface unit 113. The optical disk drive 122 is connected to the second disk interface unit 114. The display unit (display device) 123 is connected to the display control unit 115. The keyboard 124 and the mouse 125 are connected to the input interface unit 116. The printing machine body 200 is connected to the output interface unit 117 via a communication cable. The network 7 is connected to the network interface unit 118. The auxiliary storage device 121 is a magnetic disk device or the like. An optical disk 8 as a computer-readable recording medium such as a CD-ROM or a DVD-ROM is inserted into the optical disk drive 122. The display unit 123 is a liquid crystal display or the like. The display unit 123 is used to display information desired by an operator. The keyboard 124 and the mouse 125 are used by a worker to input instructions to the print control device 100.

The auxiliary storage device 121 stores a print control program (program for controlling execution of print processing by the printing machine body 200) P. The CPU 111 implements various functions of the print control device 100 by reading the print control program P stored in the auxiliary storage device 121 into the memory 112 and executing the program. The memory 112 includes a RAM and a ROM. The memory 112 functions as a work area for the CPU 111 to execute the print control program P stored in the auxiliary storage device 121. Note that the print control program P is provided by being stored in the computer-readable recording medium (non-transitory recording medium). That is, for example, the user purchases the optical disk 8 as a recording medium of the print control program P, inserts the optical disk 8 into the optical disk drive 122, reads the print control program P from the optical disk 8, and installs the print control program in the auxiliary storage device 121. Furthermore, alternatively, the print control program P transmitted via the network 7 may be received by the network interface unit 118 and installed in the auxiliary storage device 121.

<4. Functional Configuration>

Figure 4:
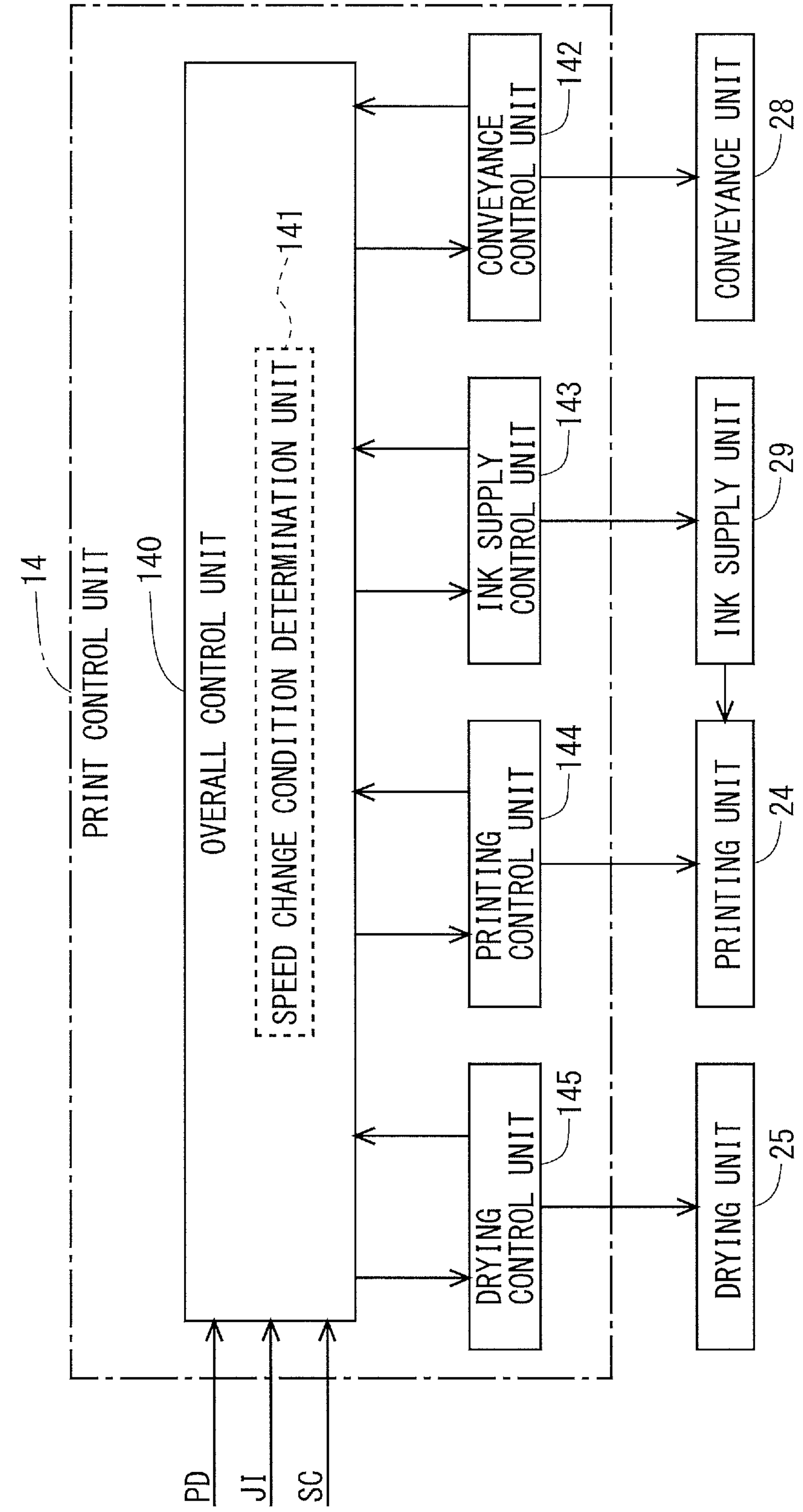
FIG. 4 is a block diagram illustrating a schematic functional configuration of a print control unit in the embodiment.

FIG. 4 is a block diagram illustrating a schematic functional configuration of a print control unit 14 implemented by the print control device 100 executing the print control program P. The print control unit 14 includes an overall control unit 140, a conveyance control unit 142, an ink supply control unit 143, a printing control unit 144, and a drying control unit 145. The overall control unit 140 includes a speed change condition determination unit 141.

The conveyance control unit 142 controls the speed (conveyance speed) at which a conveyance unit 28 conveys the printing paper PA. Note that in the present embodiment, the paper feeding unit 21, the first drive roller 22, the plurality of support rollers 23, and the second drive roller 27 form the conveyance unit 28 (see FIG. 2).

The ink supply control unit 143 controls a supply degree of ink (ink supply rate) from an ink supply unit 29 to the printing unit 24.

The printing control unit 144 controls ejection of ink from each nozzle included in each inkjet head constituting the printing unit 24. Specifically, an ejection timing of ink and an ejection amount of ink are controlled.

The drying control unit 145 controls a temperature (drying temperature) when the drying unit 25 dries the printing paper PA. For example, the drying unit 25 includes a plurality of light sources that generate heat when turned on, and the drying control unit 145 controls the drying temperature by adjusting a turn-on rate (Hereinafter, referred to as a "heater turn-on rate") of the plurality of light sources.

The overall control unit 140 controls the operations of the conveyance control unit 142, the ink supply control unit 143, the printing control unit 144, and the drying control unit 145 based on print data PD, job information JI, and a speed change instruction signal SC.

When detecting that there is a need to change the conveyance speed based on the speed change instruction signal SC, the speed change condition determination unit 141 determines a speed change condition representing a mode of acceleration or deceleration in consideration of a supply state of ink from the ink supply unit 29 to the printing unit 24 and a state of the drying unit 25. In the present embodiment, a speed change rate (acceleration/deceleration rate) that is an amount of change in the conveyance speed per unit time and a conveyance speed after speed change are included in the speed change condition. In accordance with the speed change condition determined by the speed change condition determination unit 141, the overall control unit 140 controls the operation of the conveyance control unit 142.

Note that in the present embodiment, the speed change condition determination unit 141 considers both the supply state of ink and the state of the drying unit 25 when determining the speed change condition, but the present invention is not limited thereto. When determining the speed change condition, the speed change condition determination unit 141 may consider at least one of the supply state of ink and the state of the drying unit 25.

<5. Variable Speed Printing>

As described above, the printing apparatus 10 according to the present embodiment performs variable speed printing capable of changing the conveyance speed of the printing paper during the printing operation. The variable speed printing will be described in detail below.

<5.1 Overall Process Flow>

Figure 5:
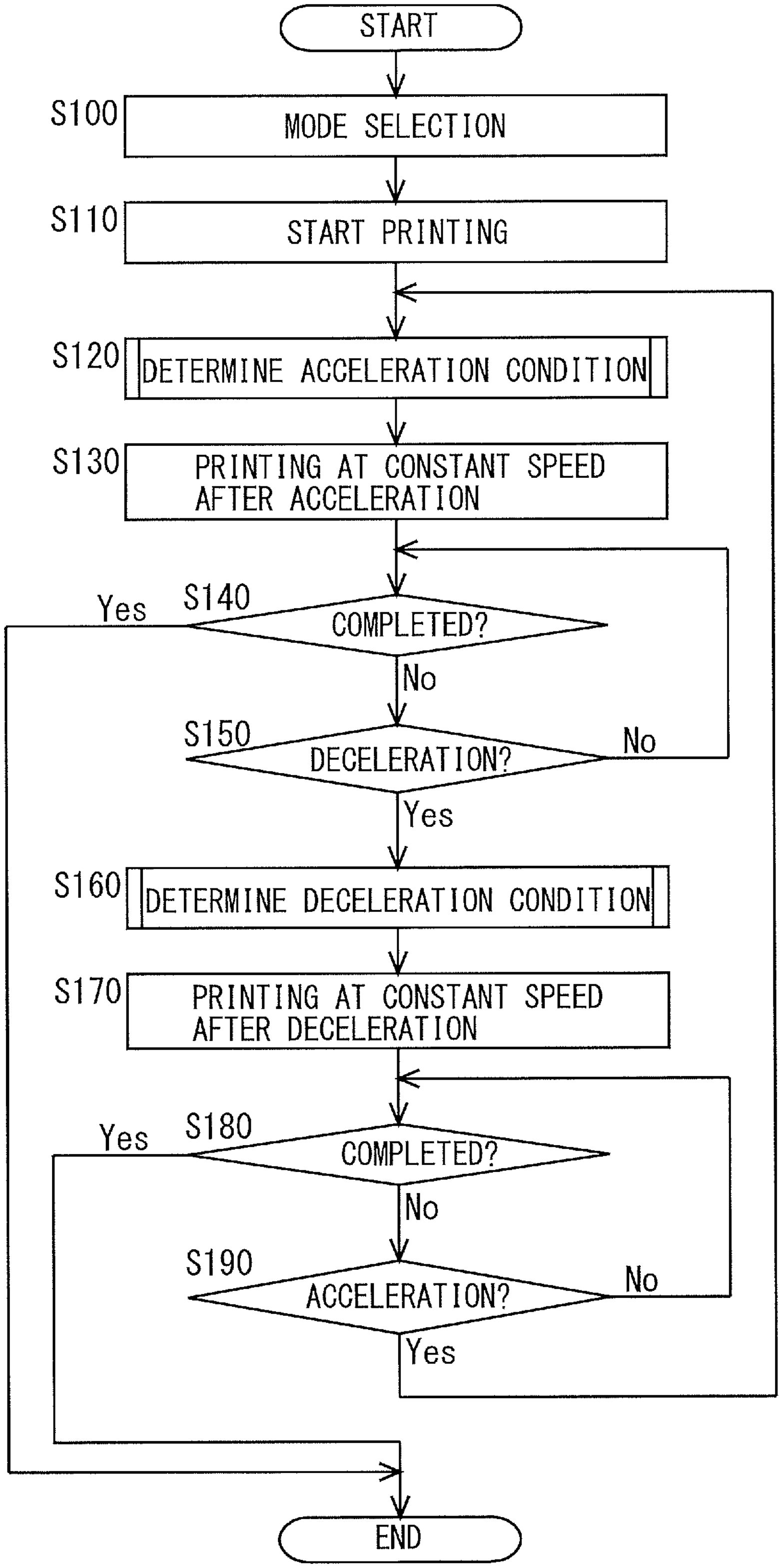
FIG. 5 is a flowchart showing an overall processing procedure related to control of a conveyance speed for variable speed printing in the embodiment.

An overall process procedure related to the control of the conveyance speed for variable speed printing will be described with reference to the flowchart illustrated in FIG. 5. Note that there is a case where two types of low speeds (these are referred to as a "first low speed" and a "second low speed", and the first low speed is assumed to have a higher speed than the second low speed) are prepared and two-stage deceleration (deceleration from a high speed to the first low speed and deceleration from the first low speed to the second low speed) or two-stage acceleration (acceleration from the second low speed to the first low speed and acceleration from the first low speed to the high speed) is performed, but here, a case where only one-stage deceleration and one-stage acceleration are performed is focused.

First, a mode is selected by a user (operator) (step S100). Here, the mode will be described. In general, the printing apparatus is prepared with a plurality of modes that can be selected by the user so as to enable printing in various ways. Then, print processing is performed in a state where the mode selected by the user is set. Unless otherwise specified, the printing apparatus 10 according to the present embodiment is provided with a print continuation mode in which printing is not stopped, a high quality mode in which a high-quality printed matter is obtained, and a drying performance mode in which a printed matter in a good dry state is obtained. In general, there are many printing apparatuses capable of simultaneously selecting two or more modes, but for convenience of description, it is assumed that a state in which two or more modes are simultaneously set is not recognized in the present embodiment. That is, the user can select only one mode when executing printing. Furthermore, in the present embodiment, the mode is selected by the user, but the mode is not necessarily selected. For example, in a case where the user does not select a mode, a predetermined mode may be set.

After the mode is selected, the operation for printing is started (step S110). After the start of the operation for printing, first, an acceleration condition is determined by the speed change condition determination unit 141 (step S120). In this regard, at the start of the processing of step S120, the conveyance speed is 0 or low. Since high-speed printing should be performed in normal times, an acceleration rate and a conveyance speed after acceleration are determined as the acceleration condition in step S120. Note that the determination of the acceleration condition will be described in detail later.

Next, the conveyance control unit 142 controls the operation of the conveyance unit 28 in accordance with the acceleration rate and the conveyance speed after acceleration determined in step S120, so that the conveyance speed is accelerated, and printing at a constant speed (high-speed printing) is performed after the end of the acceleration (step S130). While printing is being performed at a constant speed, the following steps S140 and S150 are repeated.

In step S140, it is determined whether or not printing of all pages based on given print data has been completed. As a result of the determination, when printing of all the pages has been completed, the entire processing is terminated. In this case, the conveyance speed is decelerated at a predetermined deceleration rate, and the operation of the conveyance unit 28 is stopped. On the other hand, when there is an unprinted page, the process proceeds to step S150.

In step S150, it is determined whether or not reduction in the conveyance speed is necessary. As a result of the determination, when reduction in the conveyance speed is necessary, the process proceeds to step S160, and when reduction in the conveyance speed is not necessary, the process returns to step S140. Note that different determinations may be made depending on the set mode.

In step S160, a deceleration condition is determined by the speed change condition determination unit 141. In step S160, a deceleration rate and a conveyance speed after deceleration are determined as the deceleration condition. Note that the determination of the deceleration condition will be described in detail later.

Next, the conveyance control unit 142 controls the operation of the conveyance unit 28 in accordance with the deceleration rate and the conveyance speed after deceleration determined in step S160, so that the conveyance speed is decelerated, and printing at a constant speed (low-speed printing) is performed after the end of the deceleration (step S170). While printing is being performed at a constant speed, the following steps S180 and S190 are repeated.

In step S180, it is determined whether or not printing of all pages based on given print data has been completed. As a result of the determination, when printing of all the pages has been completed, the entire processing is terminated. In this case, the conveyance speed is decelerated at a predetermined deceleration rate, and the operation of the conveyance unit 28 is stopped. On the other hand, when there is an unprinted page, the process proceeds to step S190.

In step S190, it is determined whether or not the conveyance speed can be accelerated. As a result of the determination, when the conveyance speed can be accelerated, the process returns to step S120, and when the conveyance speed cannot be accelerated, the process returns to step S180. Note that different determinations may be made depending on the set mode.

In the present embodiment, a speed change condition determination step is realized by the above step S120 and the above step S160, and a conveyance control step is realized by the above step S130 and the above step S170.

<5.2 Determination of Deceleration Condition>

A detailed procedure for determining the deceleration condition will be described with reference to FIG. 6. Note that this process of determining the deceleration condition is performed by the speed change condition determination unit 141.

First, conveyance control information is acquired (step S161). In the present embodiment, information such as speed, an applicable maximum a current conveyance deceleration rate, speed that can be set as a conveyance speed after deceleration is acquired as the conveyance control information.

Next, drying control information is acquired (step S162). In the present embodiment, information on a current heater turn-on rate and information indicating a relationship between a heater turn-on rate and an acceleration/deceleration rate (information held in a first table to be described later) are acquired. Note that a temperature sensor may be installed in the drying unit 25 to acquire information on a drying temperature.

Next, ink supply information is acquired (step S163). In the present embodiment, information on a current ink supply rate representing a supply state of ink from the ink supply unit 29 to the printing unit 24 and information representing a relationship between an ink supply rate and an acceleration/deceleration rate (information held in a second table to be described later) are acquired.

Next, a constraint condition is acquired (step S164). The constraint condition here is a condition that is a constraint on the setting of the deceleration rate and the conveyance speed after deceleration. In the present embodiment, information (information held in a third table to be described later) representing a “relationship between a conveyance speed and an acceleration/deceleration rate” in which the constraint condition caused by the operations of the front and rear devices of the printing apparatus 10 is reflected is acquired.

Finally, the deceleration condition (the deceleration rate and the conveyance speed after deceleration) is determined based on the currently set mode (the mode selected in step S100 in FIG. 5) and the information acquired in steps S161 to S164 (step S165).

<5.2.1 Determination of Deceleration Rate>

HOW the deceleration rate is determined will be described with a specific example. However, the example illustrated here is an example, and the present invention is not limited thereto. Note that it is assumed that there is a constraint that the acceleration/deceleration rate needs to be set to 70% or less from the viewpoint of ensuring the stability of conveyance of the printing paper.

Figure 8:
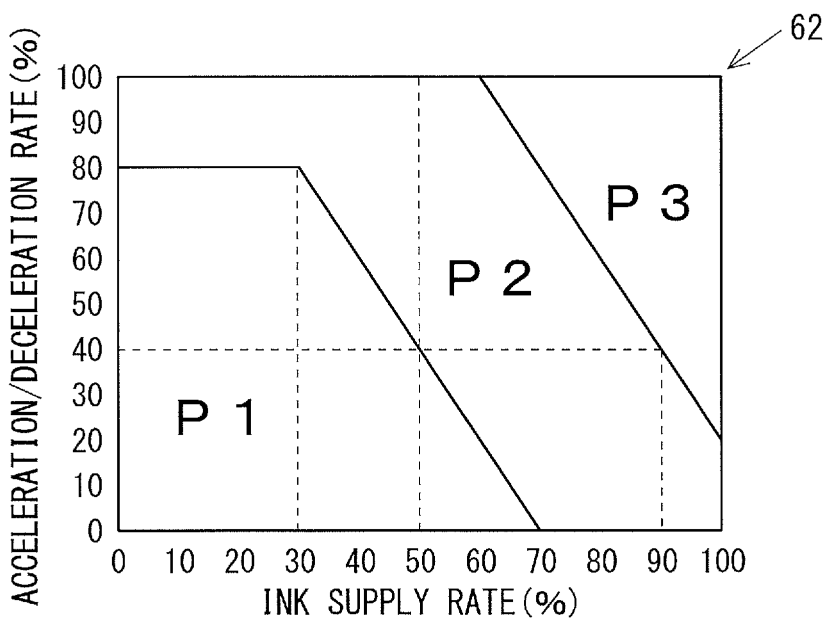
FIG. 8 is a diagram schematically illustrating contents held in a second table in the embodiment.
Figure 9:
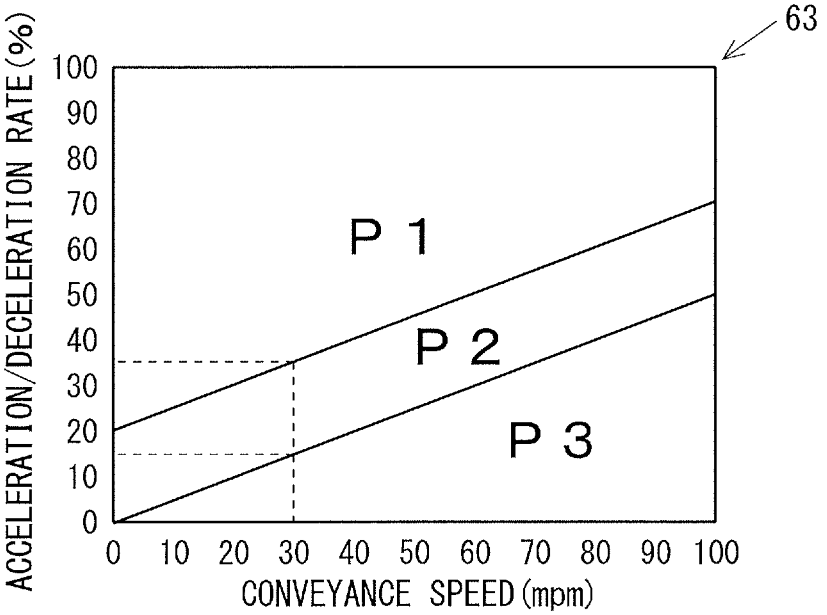
FIG. 9 is a diagram schematically illustrating contents held in a third table in the embodiment.

In the present embodiment, in order to determine the deceleration rate, a table (hereinafter, referred to as a “first table”) 61 schematically illustrated in FIG. 7, a table (hereinafter, referred to as a “second table”) 62 schematically illustrated in FIG. 8, and a table (hereinafter, referred to as a “third table”) 63 schematically illustrated in FIG. 9 are prepared in advance. Note that the first table 61, the second table 62, and the third table 63 are held in, for example, the auxiliary storage device 121 (see FIG. 3).

Figure 7:
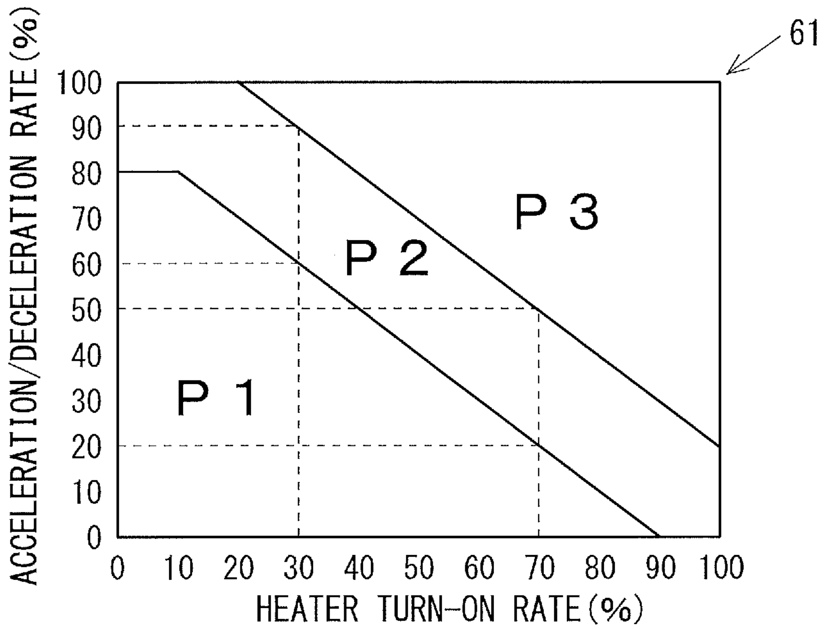
FIG. 7 is a diagram schematically illustrating contents held in a first table in the embodiment.

In the first table 61, a correspondence relationship between a combination of a heater turn-on rate and an acceleration/deceleration rate and a score is held (see FIG. 7). In the second table 62, a correspondence relationship between a combination of an ink supply rate and an acceleration/deceleration rate and a score is held (see FIG. 8). In the third table 63, a correspondence relationship between a combination of a conveyance speed after deceleration and an acceleration/deceleration rate and a score is held (see FIG. 9). P1, P2, and P3 in FIGS. 7 to 9 are scores that satisfy a relationship of “P1>P2>P3”. For example, P1 is 10, P2 is 5, and P3 is 0. However, values of P1, P2, and P3 may be different among the first table 61, the second table 62, and the third table 63. For example, with respect to the example illustrated in FIG. 7, attention is paid to a case where the heater turn-on rate is 40%. In this case, for example, a score in the case of the acceleration/deceleration rate 30% is P1, a score in the case of the acceleration/deceleration rate 70% is P2, and a score in the case of the acceleration/deceleration rate 90% is P3.

Note that a table used for determining the deceleration rate and a table used for determining the acceleration rate may be different tables. For example, as the first table 61, two tables of a table holding a correspondence relationship between a combination of heater turn-on rate and a deceleration rate and a score and a table holding a correspondence relationship between a combination of a heater turn-on rate and an acceleration rate and a score may be prepared. The same applies to the second table 62 and the third table 63.

Attention is paid to the first table 61 (see FIG. 7). In general, the higher the heater turn-on rate, the higher the influence of acceleration/deceleration of the conveyance speed on a dry state of the printing paper, and the higher the acceleration/deceleration rate, the higher the influence of acceleration/deceleration of the conveyance speed on the dry state of the printing paper. Therefore, the first table 61 is created such that the higher the heater turn-on rate, the lower the score, and the higher the acceleration/deceleration rate, the lower the score.

Attention is paid to the second table 62 (see FIG. 8). In general, the higher the ink supply rate, the higher the influence of acceleration/deceleration of the conveyance speed on a supply state of ink to the printing unit 24, and the higher the acceleration/deceleration rate, the higher the influence of acceleration/deceleration of the conveyance speed on the supply state of ink to the printing unit 24. Therefore, the second table 62 is created such that the higher the ink supply rate, the lower the score, and the higher the acceleration/deceleration rate, the lower the score.

Attention is paid to the third table 63 (see FIG. 9). The third table 63 is created in consideration of constraints based on the operations of the front and rear devices (a conveyance source of the printing paper or a conveyance destination of the printed printing paper) (for example, a post-processing machine) of the printing apparatus 10.

Under a situation where the first to third tables 61 to 63 as described above are prepared, it is assumed that an instruction to "reduce the conveyance speed from 100 mpm to 30 mpm at a deceleration rate of 60%" is sent from the post-processing machine to the printing apparatus 10. In this case, the deceleration rate is determined in accordance with the currently set mode (the mode selected in step S100 in FIG. 5), for example, as follows.

In a case where the print continuation mode is set, an acceleration/deceleration rate closest to 60% among the acceleration/deceleration rates satisfying a condition that "the score of the combination of the current heater turn-on rate and the acceleration/deceleration rate is P1 or P2, and the score of the combination of the current ink supply rate and the acceleration/deceleration rate is P1 or P2, and the score of the combination of the conveyance speed after deceleration and the acceleration/deceleration rate is P1." is determined as the deceleration rate to be applied at the time of the current deceleration. As a result, the deceleration rate is determined such that the requirement that printing does not stop halfway is preferentially satisfied rather than the good quality of the printed matter and the good dry state of the printed matter.

For example, it is assumed that the current heater turn-on rate is 30% and the current ink supply rate is 50%. In this case, the acceleration/deceleration rate satisfying a condition that "the score of the combination of the current heater turn-on rate and the acceleration/deceleration rate is P1 or P2" is 0 to 90%, and the acceleration/deceleration rate satisfying a condition that "the score of the combination of the current ink supply rate and the acceleration/deceleration rate is P1 or P2" is 0 to 100%. Furthermore, since the conveyance speed after deceleration is 30 mpm on the basis of the above instruction, the acceleration/deceleration rate satisfying a condition that "the score of the combination of the conveyance speed after deceleration and the acceleration/deceleration rate is P1" is 35 to 100%. From the above, in this case, the deceleration rate is determined to be 60%.

Furthermore, for example, it is assumed that the current heater turn-on rate is 70% and the current ink supply rate is 50%. In this case, the acceleration/deceleration rate satisfying a condition that "the score of the combination of the current heater turn-on rate and the acceleration/deceleration rate is P1 or P2" is 0 to 50%, and the acceleration/deceleration rate satisfying a condition that "the score of the combination of the current ink supply rate and the acceleration/deceleration rate is P1 or P2" is 0 to 100%. The acceleration/deceleration rate satisfying a condition that "the score of the combination of the conveyance speed after deceleration and the acceleration/deceleration rate is P1" is 35 to 100%. From the above, in this case, the deceleration rate is determined to be 50%.

Moreover, for example, it is assumed that the current heater turn-on rate is 30% and the current ink supply rate is 90%. In this case, the acceleration/deceleration rate satisfying a condition that "the score of the combination of the current heater turn-on rate and the acceleration/deceleration rate is P1 or P2" is 0 to 90%, and the acceleration/deceleration rate satisfying a condition that "the score of the combination of the current ink supply rate and the acceleration/deceleration rate is P1 or P2" is 0 to 40%. The acceleration/deceleration rate satisfying a condition that "the score of the combination of the conveyance speed after deceleration and the acceleration/deceleration rate is P1" is 35 to 100%. From the above, in this case, the deceleration rate is determined to be 40%.

In a case where the drying performance mode is set, an acceleration/deceleration rate closest to 60% among the acceleration/deceleration rates satisfying "the score of the combination of the current heater turn-on rate and the acceleration/deceleration rate is P1, and the score of the combination of current the ink supply rate and the acceleration/deceleration rate is P1 or P2, and the score of the combination of the conveyance speed after deceleration and the acceleration/deceleration rate is P1 or P2" is determined as the deceleration rate to be applied at the time of the current deceleration. As a result, the deceleration rate is determined such that the good dry state of the printed matter is preferentially satisfied rather than the good quality of the printed matter and the fact that printing does not stop halfway.

For example, it is assumed that the current heater turn-on rate is 30% and the current ink supply rate is 50%. In this case, the acceleration/deceleration rate satisfying a condition that "the score of the combination of the current heater turn-on rate and the acceleration/deceleration rate is P1" is 0 to 60%, and the acceleration/deceleration rate satisfying a condition that "the score of the combination of the current ink supply rate and the acceleration/deceleration rate is P1 or P2" is 0 to 100%. Furthermore, since the conveyance speed after deceleration is 30 mpm on the basis of the above instruction, the acceleration/deceleration rate satisfying a condition that "the score of the combination of the conveyance speed after deceleration and the acceleration/deceleration rate is P1 or P2" is 15 to 100%. From the above, in this case, the deceleration rate is determined to be 60%.

Furthermore, for example, it is assumed that the current heater turn-on rate is 70% and the current ink supply rate is 50%. In this case, the acceleration/deceleration rate satisfying a condition that "the score of combination of the current heater turn-on rate and the acceleration/deceleration rate is P1" is 0 to 20%, and the acceleration/deceleration rate satisfying a condition that "the score of the combination of the current ink supply rate and the acceleration/deceleration rate is P1 or P2" is 0 to 100%. The acceleration/deceleration rate satisfying a condition that "the score of the combination of the conveyance speed after deceleration and the acceleration/deceleration rate is P1 or P2" is 15 to 100%. From the above, in this case, the deceleration rate is determined to be 20%.

Moreover, for example, it is assumed that the current heater turn-on rate is 30% and the current ink supply rate is 90%. In this case, the acceleration/deceleration rate satisfying a condition that "the score of the combination of the current heater turn-on rate and the acceleration/deceleration rate is P1" is 0 to 60%, and the acceleration/deceleration rate satisfying a condition that "the score of the combination of the current ink supply rate and the acceleration/deceleration rate is P1 or P2" is 0 to 40%. The acceleration/deceleration rate satisfying a condition that "the score of the combination of the conveyance speed after deceleration and the acceleration/deceleration rate is P1 or P2" is 15 to 100%. From the above, in this case, the deceleration rate is determined to be 40%.

Figure 10:
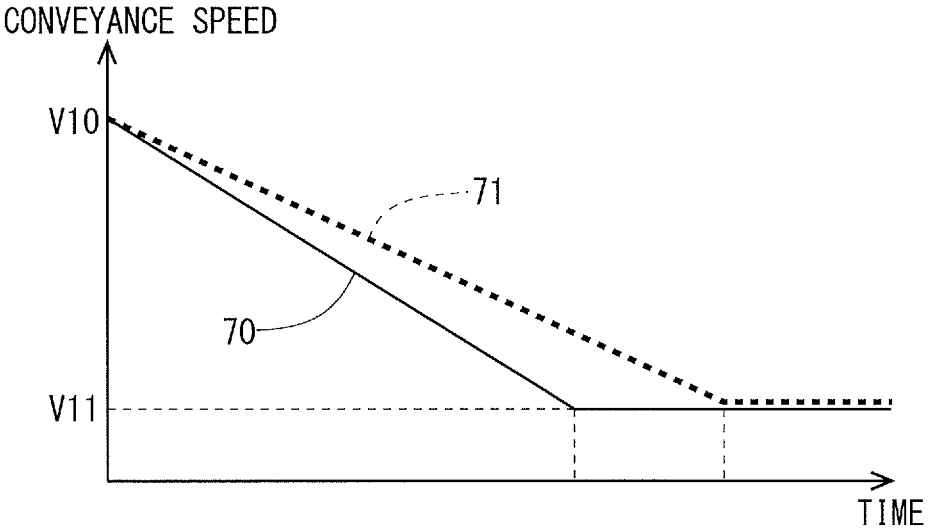
FIG. 10 is a diagram for describing an example in which a value of a deceleration rate differs depending on a set mode in the embodiment.

By the way, when the current heater turn-on rate is 70%, the acceleration/deceleration rate satisfying a condition that "the score of the combination of the current heater turn-on rate and the deceleration rate is P1 or P2" is 0 to 50%, but the acceleration/deceleration rate satisfying a condition that "the score of the combination of the current heater turn-on rate and the deceleration rate is P1" is 0 to 20% (see FIG. 7). Therefore, as in the above example, in a case where the drying performance mode is set, the deceleration rate may be determined to be a lower value than a case where the print continuation mode is set. For example, regarding the deceleration of the conveyance speed from V10 to V11, in a case where the print continuation mode is set, deceleration is performed as indicated by a solid line denoted by reference character 70 in FIG. 10, whereas in a case where the dry performance mode is set, deceleration is performed as indicated by a thick dotted line denoted by reference character 71 in FIG. 10. Regarding the example illustrated in FIG. 10, when the deceleration is performed as indicated by a solid line denoted by reference character 70, for example, excessive drying of the printing paper occurs. On the other hand, when the deceleration is performed as indicated by a thick dotted line denoted by reference character 71, a printed matter in a good dry state is obtained.

In a case where the high quality mode is set, an acceleration/deceleration rate closest to 60% among the acceleration/deceleration rates satisfying "the score of the combination of the current heater turn-on rate and the acceleration/deceleration rate is P1 or P2, and the score of the combination of the current ink supply rate and the acceleration/deceleration rate is P1, and the score of the combination of the conveyance speed after deceleration and the acceleration/deceleration rate is P1 or P2." is determined as the deceleration rate to be applied in the current deceleration. As a result, the deceleration rate is determined such that the good quality of the printed matter is preferentially satisfied rather than the good dry state of the printed matter and the fact that printing does not stop halfway.

For example, it is assumed that the current heater turn-on rate is 30% and the current ink supply rate is 30%. In this case, the acceleration/deceleration rate satisfying a condition that "the score of the combination of the current heater turn-on rate and the acceleration/deceleration rate is P1 or P2" is 0 to 90%, and the acceleration/deceleration rate satisfying a condition that "the score of the combination of the current ink supply rate and the acceleration/deceleration rate is P1" is 0 to 80%. Furthermore, since the conveyance speed after deceleration is 30 mpm on the basis of the above instruction, the acceleration/deceleration rate satisfying a condition that "the score of the combination of the conveyance speed after deceleration and the acceleration/deceleration rate is P1 or P2" is 15 to 100%. From the above, in this case, the deceleration rate is determined to be 60%.

Furthermore, for example, it is assumed that the current heater turn-on rate is 70% and the current ink supply rate is 30%. In this case, the acceleration/deceleration rate satisfying a condition that "the score of the combination of the current heater turn-on rate and the acceleration/deceleration rate is P1 or P2" is 0 to 50%, and the acceleration/deceleration rate satisfying a condition that "the score of the combination of the current ink supply rate and the acceleration/deceleration rate is P1" is 0 to 80%. The acceleration/deceleration rate satisfying a condition that "the score of the combination of the conveyance speed after deceleration and the acceleration/deceleration rate is P1 or P2" is 15 to 100%. From the above, in this case, the deceleration rate is determined to be 50%.

Moreover, for example, it is assumed that the current heater turn-on rate is 30% and the current ink supply rate is 50%. In this case, the acceleration/deceleration rate satisfying a condition that "the score of the combination of the current heater turn-on rate and the acceleration/deceleration rate is P1 or P2" is 0 to 90%, and the acceleration/deceleration rate satisfying a condition that "the score of the combination of the current ink supply rate and the acceleration/deceleration rate is P1" is 0 to 40%. The acceleration/deceleration rate satisfying a condition that "the score of the combination of the conveyance speed after deceleration and the acceleration/deceleration rate is P1 or P2" is 15 to 100%. From the above, in this case, the deceleration rate is determined to be 40%.

In the present embodiment, as described above, the deceleration rate is determined depending on the set mode in consideration of the current ink supply rate (supply state of ink from the ink supply unit 29 to the printing unit 24) and the current heater turn-on rate (state of the drying unit 25). As a result, an increase in the printing time due to a decrease in the conveyance speed is suppressed when the print continuation mode is set, the occurrence of uneven drying is effectively suppressed when the drying performance mode is set, and the occurrence of variations related to the supply of ink is effectively suppressed when the high quality mode is set. Furthermore, since the constraints based on the operations of the front and rear devices of the printing apparatus 10 are taken into consideration, for example, the stop of printing due to the occurrence of an error in the front and rear devices is suppressed.

Figure 11:
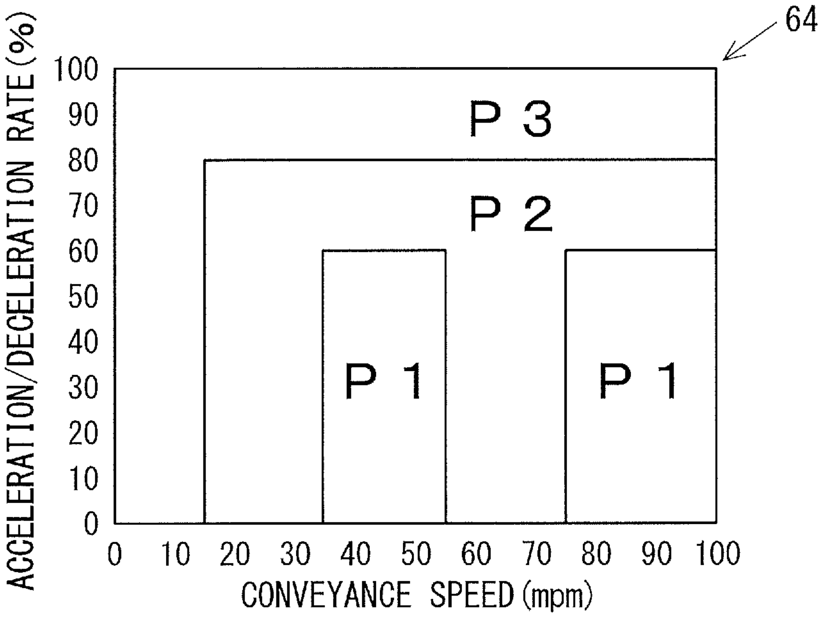
FIG. 11 is a diagram schematically illustrating contents held in a fourth table in the embodiment.

Note that here, the three tables (the first to third tables 61 to 63) are exemplified, but other tables may be prepared. For example, the configuration may be such that a table (hereinafter, referred to as a "fourth table") 64 as schematically illustrated in FIG. 11 created in consideration of constraints related to printing control such as ink ejection control (control of an ejection state of ink from an inkjet head to a printing paper) is prepared, and the deceleration rate is determined also in consideration of a correspondence relationship held in the fourth table 64 (correspondence relationship between a combination of the conveyance speed deceleration after and the acceleration/deceleration rate and a score). As a result, for example, it is possible to more effectively suppress deterioration in print quality due to a change in the conveyance speed.

Figure 12:
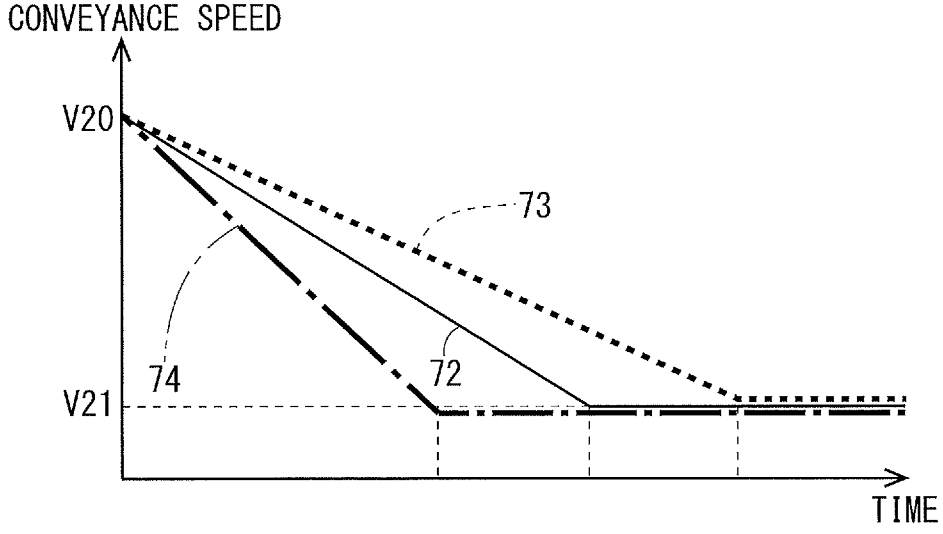
FIG. 12 is a diagram for explaining an example in which a value of a deceleration rate differs depending on a set mode in the embodiment.

Furthermore, although it is assumed that the print continuation mode, the high quality mode, and the drying performance mode are prepared as the settable modes in the above description, other modes may be prepared. For example, a paper saving mode for minimizing the occurrence of waste paper may be prepared, and the deceleration rate may be determined as follows. Regarding the deceleration of the conveyance speed from V20 to V21, in a case where the print continuation mode is set, deceleration is performed as indicated by a solid line denoted by reference character 72 in FIG. 12, in a case where the high quality mode or the drying performance mode is set, deceleration is performed as indicated by a thick dotted line denoted by reference character 73 in FIG. 12, and in a case where the paper saving mode is set, deceleration is performed as indicated by a thick chain line denoted by reference character 74 in FIG. 12. As above, in a case where the paper saving mode is set, the deceleration rate is determined such that waste paper is not generated as much as possible, though good print quality and good drying performance cannot be obtained.

<5.2.2 Determination of Conveyance Speed after Deceleration>

Next, how the conveyance speed after deceleration is determined will be described. However, the example illustrated here is an example, and the present invention is not limited thereto. Note that it is assumed that three speeds (40 mpm, 30 mpm, and 20 mpm) are prepared as the conveyance speed after deceleration that can be set.

In a case where the print continuation mode or the drying performance mode is set, the conveyance speed after deceleration is determined in accordance with a request from the post-processing machine or the like to the printing apparatus 10. When an instruction to "reduce the conveyance speed from 100 mpm to 30 mpm at a deceleration rate of 60%" is sent from the post-processing machine to the printing apparatus 10 as in the example described above, the conveyance speed after deceleration is determined to be 30 mpm.

In a case where the high quality mode is set, the conveyance speed after deceleration is determined based on a preset "relationship between the ink supply rate and the conveyance speed after deceleration". Here, it is assumed that an ink supply rate of 0% or more and less than 70% is associated with 30 mpm, and an ink supply rate of 70% or more is associated with 40 mpm. In this case, for example, when the current ink supply rate is 50%, the conveyance speed after deceleration is determined to be 30 mpm, and for example, when the current ink supply rate is 80%, the conveyance speed after deceleration is determined to be 40 mpm.

Figure 13:
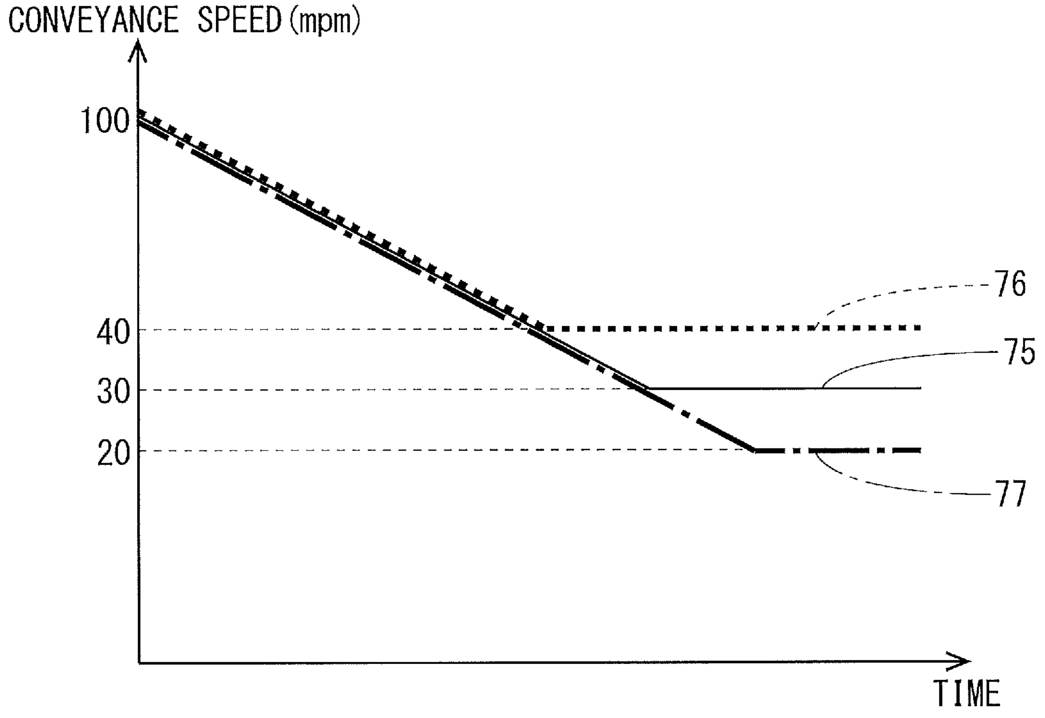
FIG. 13 is a diagram for explaining an example in which a conveyance speed after deceleration differs depending on a set mode in the embodiment.

Furthermore, in a case where the paper saving mode described above is prepared and set, the conveyance speed after deceleration may be determined to be lower than the speed based on the instruction from the post-processing machine. In this case, in a case where the print continuation mode or the drying performance mode is set, deceleration is performed as indicated by a solid line denoted by reference character 75 in FIG. 13, in a case where the high quality mode is set, deceleration is performed as indicated by a thick dotted line denoted by reference character 76 in FIG. 13, and in a case where the paper saving mode is set, deceleration is performed as indicated by a thick chain line denoted by reference character 77 in FIG. 13.

<5.3 Determination of Acceleration Condition>

Figure 14:
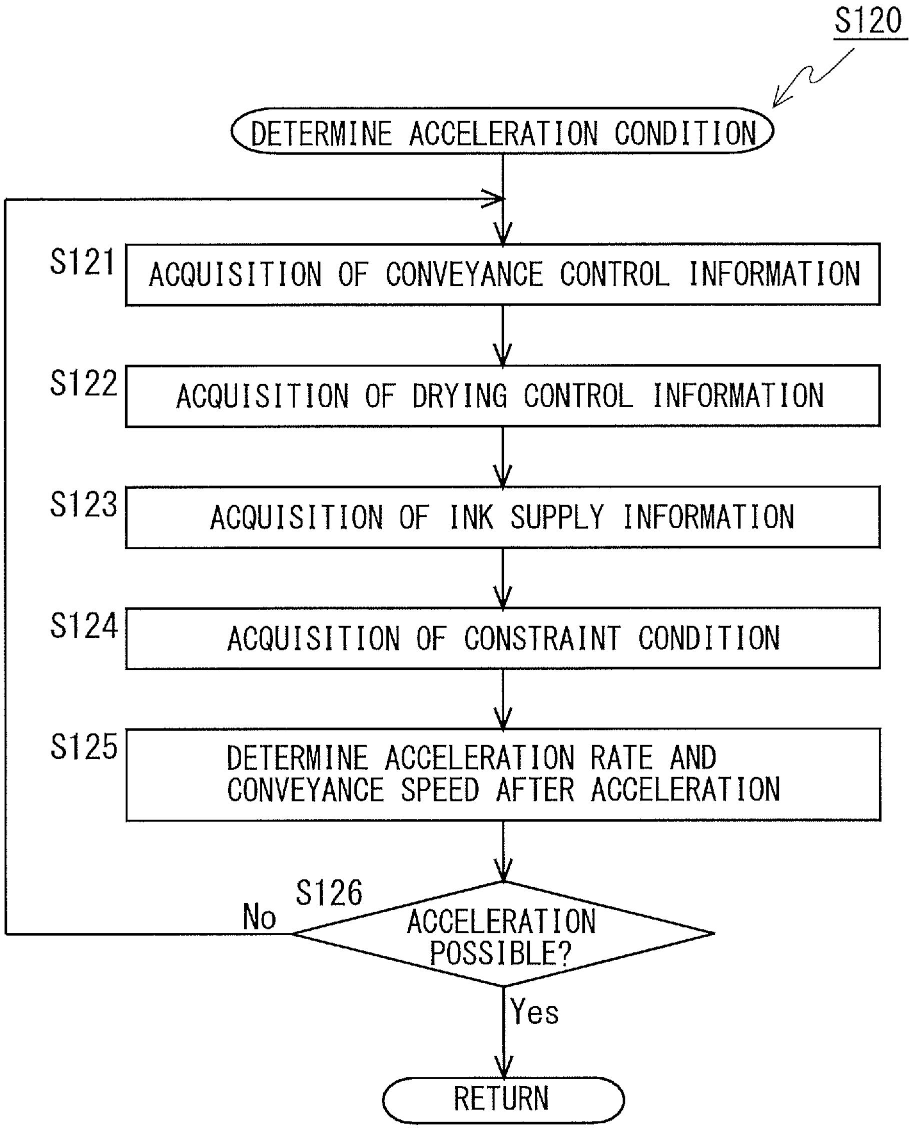
FIG. 14 is a flowchart showing a detailed procedure for determining an acceleration condition in the embodiment.

A detailed procedure for determining the acceleration condition will be described with reference to FIG. 14. Note that this process of determining the acceleration condition is performed by the speed change condition determination unit 141 similarly to the process of determining the deceleration condition.

Figure 6:
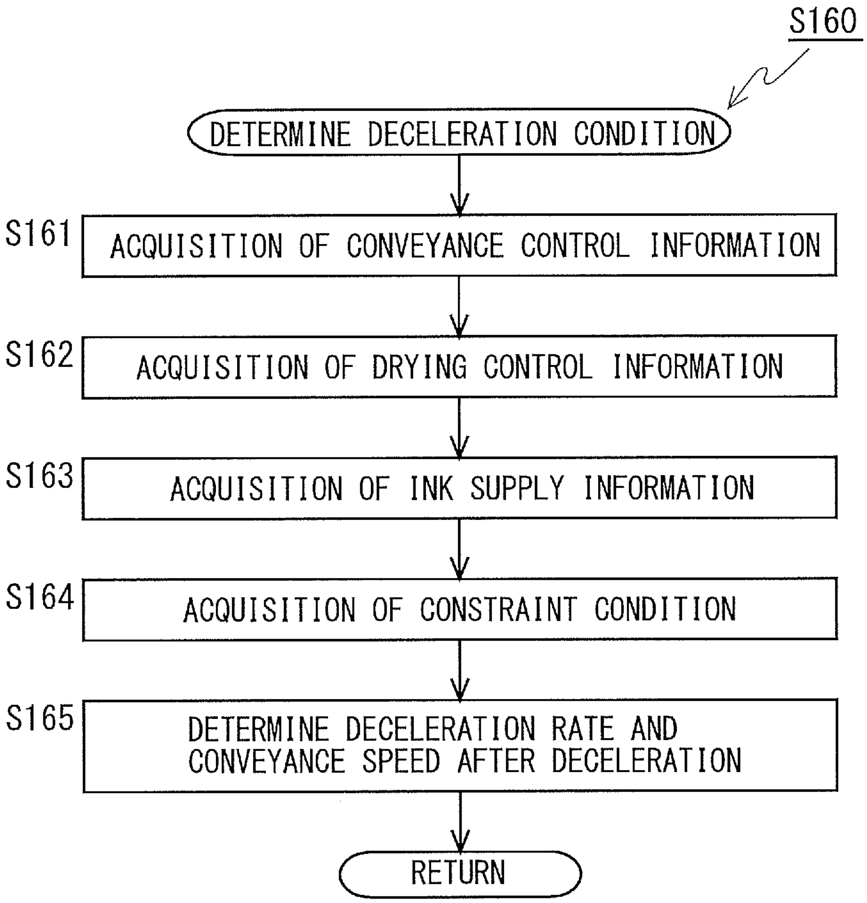
FIG. 6 is a flowchart showing a detailed procedure for determining a deceleration condition in the embodiment.

In steps S121 to S124, processing similar to that in steps S161 to S164 in FIG. 6 is performed. In step S125, the acceleration condition (the acceleration rate and the conveyance speed after acceleration) is determined based on the currently set mode (the mode selected in step S100 in FIG. 5) and the information acquired in steps S161 to S164. Note that the acceleration rate is determined by the same method as the deceleration rate, and the conveyance speed after acceleration is usually determined to be the maximum speed.

Thereafter, it is determined whether or not the conveyance speed can be actually accelerated under the acceleration condition determined in step S125 (step S126). Regarding this, for example, a threshold for the heater turn-on rate is determined, and when the current heater turn-on rate is higher than the threshold, it is determined that acceleration is possible. As a result of the determination in step S126, when acceleration is possible, the process proceeds to step S130 in FIG. 5, and when acceleration is not possible, the process returns to step S121. In this manner, the conveyance speed is changed from a low speed to a high speed after the actually ready for acceleration.

<6. Effects>

According to the present embodiment, the speed change condition determination unit 141 that, when it is necessary conveyance speed of the printing paper, to change a determines a speed change rate and a conveyance speed after speed change is provided in the print control unit 14, and the speed change condition determination unit 141 determines the speed change rate and the conveyance speed after speed change in consideration of a supply state of ink from the ink supply unit 29 to the printing unit 24 and a state of the drying unit 25. As a result, it is possible to suppress the occurrence of variations related to the supply of ink and the occurrence of uneven drying caused by the fact that the control of a temperature in the drying unit 25 cannot follow the change in the conveyance speed. As a result, deterioration in print quality is suppressed. As above, an inkjet printing apparatus capable of changing a conveyance speed of printing paper in such a way that deterioration in print quality is suppressed as much as possible when it is necessary to change the conveyance speed of the printing paper is realized.

<7. Modifications>

Hereinafter, modifications of the above embodiment will be described.

<7.1 Acceleration/Deceleration in Two Stages>

In the above embodiment, attention has been paid to a case where only deceleration in one stage and acceleration in one stage are performed. However, the present invention can also be applied to a case where deceleration in two stages or acceleration in two stages is performed. Note that according to the configuration capable of acceleration/deceleration in two stages, the conveyance speed can be more flexibly changed, so that deterioration in print quality due to the change in the conveyance speed is effectively suppressed.

<7.1.1 First Modification>

Figure 15:
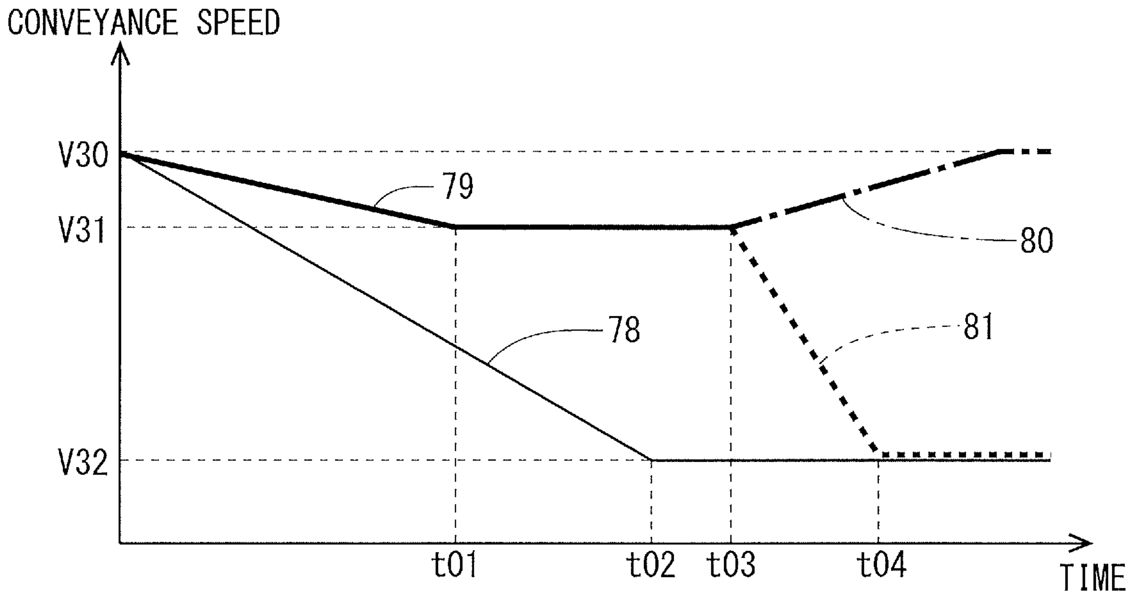
FIG. 15 is a diagram illustrating a change example of a conveyance speed in a first modification of the embodiment.

First, with reference to FIG. 15, an operation example in a case where the conveyance speed needs to be decelerated due to a delay in transfer of print data (image data) from server 40 to the printing apparatus 10 will be the RIP described as a first modification. Note that it is assumed that the conveyance speed needs to be decelerated due to a large decrease in the free space of the buffer due to a delay in transfer of the print data. Furthermore, here, it is assumed that a special mode is prepared in which printing is not stopped as much as possible while suppressing deterioration in print quality. In the present modification, different operations are performed between a case where the special mode is set and a case where a mode other than the special mode is set.

Regarding the deceleration of the conveyance speed from V30 to V32, in a case where a mode other than the special mode is set, deceleration is performed at relatively high deceleration rate as indicated by a solid line denoted by reference character 78 in FIG. 15. In this case, the conveyance speed reaches V32 at time t02.

On the other hand, in a case where the special mode is set, first, as indicated by a thick solid line denoted by reference character 79 in FIG. 15, the conveyance speed is decelerated from V30 to V31 at a relatively low deceleration rate. Note that V31 is a speed higher than V32. After the conveyance speed reaches V31 at time t01, the conveyance speed is maintained at V31. Then, at time t03, it is determined whether or not the free space of the buffer has recovered to a predetermined threshold. As a result of the determination, when the free space of the buffer has recovered to the threshold, the conveyance speed is accelerated from V31 to V30 as indicated by a thick chain line denoted by reference character 80 in FIG. 15. On the other hand, when the free space of the buffer has not recovered to the threshold, the conveyance speed is further decelerated as indicated by a dotted line denoted by reference character 81 in FIG. 15, and the conveyance speed reaches V32 at time t04.

As above, according to the present modification, the conveyance speed is suppressed from decreasing more than necessary when the special mode is set. As a result, the printing time in a case where acceleration/deceleration of the conveyance speed is performed during printing can be made shorter than before.

Note that in the example illustrated in FIG. 15, V30 corresponds to the high speed, V31 corresponds to the first low speed, and V32 corresponds to the second low speed.

<7.1.2 Second Modification>

Next, with reference to FIG. 16, an example in which acceleration/deceleration in two stages is performed in consideration of the state of the drying unit 25 will be described as a second modification. In the present modification, different operations are performed between a case where the drying performance mode is set and a case where a mode other than the drying performance mode is set.

Figure 16:
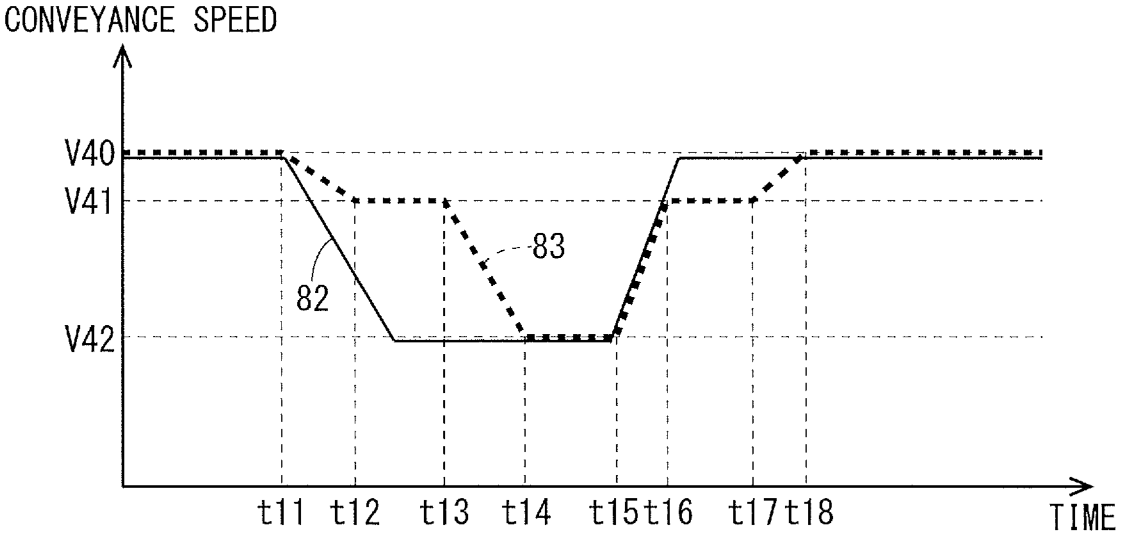
FIG. 16 is a diagram illustrating a change example of a conveyance speed in a second modification of the embodiment.

Regarding the deceleration of the conveyance speed from V40 to V42 and the acceleration of the conveyance speed from V42 to V40, in a case where a mode other than the drying performance mode is set, as indicated by a solid line denoted by reference character 82 in FIG. 16, deceleration from V40 to V42 is performed at a relatively high deceleration rate, and then acceleration from V42 to V40 is performed at a relatively high acceleration rate. In this manner, in the case where a mode other than the drying performance mode is set, acceleration/deceleration in one stage is performed.

On the other hand, in the case where the drying performance mode is set, deceleration in two stages and acceleration in two stages are performed as indicated by a thick dotted line denoted by reference character 83 in FIG. 16. Specifically, first, at time t11, the conveyance speed is decelerated at a relatively low deceleration rate. After the conveyance speed reaches V41 at time t12, the conveyance speed is maintained at V41. This is to wait until the heater turn-on rate sufficiently decreases to prevent excessive drying of a printed matter. When the heater turn-on rate sufficiently decreases at time t13, the conveyance speed is decelerated from V41 to V42 at a relatively high deceleration rate. After the conveyance speed reaches V42 at time t14, when a state in which printing has to be performed with the conveyance speed set to a low speed (V42) is resolved at time t15, the conveyance speed is accelerated from V42 to V41 at a relatively high acceleration rate. After the conveyance speed reaches V41 at time t16, the conveyance speed is maintained at V41. This is to wait for the heater turn-on rate to increase sufficiently to prevent insufficient drying of the printed matter. When the heater turn-on rate sufficiently increases at time t17, the conveyance speed is accelerated from V41 to V40 at a relatively low acceleration rate. Then, the conveyance speed reaches V40 at time t18.

As above, according to the present modification, when the drying performance mode is set, the conveyance speed is decelerated such that excessive drying of the printed matter does not occur and the conveyance speed is accelerated such that insufficient drying of the printed matter does not occur.

Note that in the example illustrated in FIG. 16, V40 corresponds to the high speed, V41 corresponds to the first low speed, and V42 corresponds to the second low speed.

<7.2 Example in which Conveyance Speed and Acceleration/Deceleration Rate are Indefinite (Third Modification)>

An example in which the conveyance speed and the acceleration/deceleration rate are indefinite will be described third modification. In the present modification, the conveyance speed changes as indicated by a solid line denoted by reference character 84 in FIG. 17. The present invention can also be applied to such a case where the conveyance speed irregularly changes during the execution of printing.

<7.3 Example in which a Plurality of Modes is Selectable (Fourth Modification)>

In the above embodiment, it is assumed that the print continuation mode, the high quality mode, and the drying performance mode are prepared, and the user can select only one mode. However, in practice, there are many printing apparatuses capable of simultaneously selecting two or more modes. Therefore, an example in which a plurality of modes can be selected at the same time will be described as a fourth modification.

In the present modification, when it is necessary to change the conveyance speed under a situation where a plurality of modes is selected, a process of determining which mode is to be prioritized (hereinafter, the process is referred to as "priority mode determination process") is performed prior to the process of determining the speed change condition (deceleration condition and acceleration condition). Then, the process of determining the speed change condition is performed on the basis of a result of the priority mode determination process. For example, it is assumed that under a situation where all of the print continuation mode, the high quality mode, and the drying performance mode are selected, the determination to give priority to the high quality mode is made by the priority mode determination process. In this case, assuming that the print continuation mode and the drying performance mode are not set but the high quality mode is set, for example, the speed change condition is determined by the same procedure as in the above embodiment. The priority mode determination process will be described below.

Figures 17, 18:
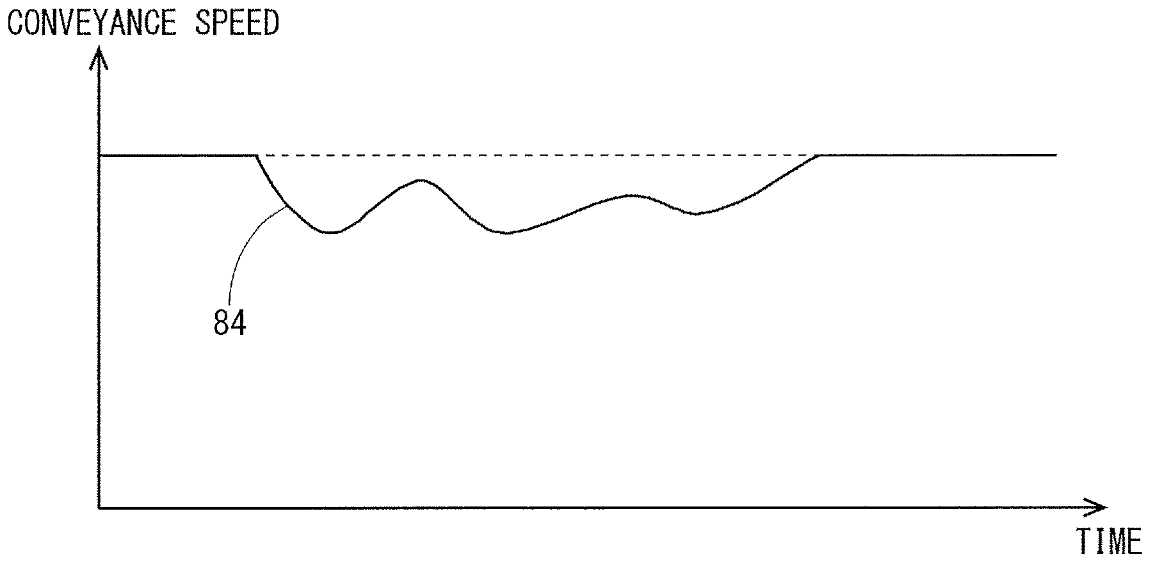
FIG. 17 is a diagram illustrating a change example of a conveyance speed in a third modification of the embodiment.
FIG. 18 is a diagram schematically illustrating contents held in a priority setting table in a fourth modification of the embodiment.

In order to perform the priority mode determination process, a table (hereinafter, referred to as a "priority setting table") 65 schematically illustrated in FIG. 18 in which priorities for various control factors are held for each mode is prepared in advance. Specifically, in the priority setting table 65, for each mode, priority with respect to each of the constraints of the front and rear devices, the conveyance control, the drying control, the ink supply control, and the printing control is held. For example, from a column indicated by an arrow denoted by reference character 85 in FIG. 18, it can be grasped that good printing control is most emphasized in a case where the high quality mode is set. Furthermore, for example, from a row indicated by an arrow denoted by reference character 86 in FIG. 18, it can be grasped that the satisfactory drying control is most emphasized in a case where the drying performance mode is set among the above three modes. The priority retained in the priority setting table 65 may be changed by the user as necessary. Note that the constraints of the front and rear devices are associated with the third table (see FIG. 9), the drying control is associated with the first table (see FIG. 7), the ink supply control is associated with the second table (see FIG. 8), and the printing control is associated with the fourth table (see FIG. 11).

Under a situation where the priority setting table 65 as described above is prepared, a mode to be prioritized is determined as follows, for example. Note that here, it is assumed that an instruction to "decrease the conveyance speed from 100 mpm to 30 mpm at a deceleration rate of 60%" is sent from the post-processing machine to the printing apparatus 10. Furthermore, it is assumed that the current heater turn-on rate is 50% and the current ink supply rate is 90%.

First, a score is obtained for each control factor (see FIG. 19). Regarding the constraints of the front and rear devices, since the deceleration rate is 60% and the conveyance speed after deceleration is 30 mpm, the score is P1 from FIG. 9. Regarding the conveyance control, it is assumed here that the score is uniformly P1. Regarding the drying control, since the deceleration rate is 60% and the heater turn-on rate is 50%, the score is P2 from FIG. 7. Regarding the ink supply control, since the deceleration rate is 60% and the ink supply rate is 90%, the score is P3 from FIG. 8. Regarding the printing control, since the deceleration rate is 60% and the conveyance speed after deceleration is 30 mpm, the score is P2 from FIG. 11. Note that it is assumed that specific numerical values of the scores P1 to P3 are "P1=10, P2=50, P3=0".

Next, for each mode, the product of the score obtained as described above and the priority is obtained for each control factor. For example, regarding a portion denoted by reference character 87 in FIG. 19, since the score (numerical value) for the constraints of the front and rear devices is 10 and the priority is 5 from FIG. 18, the product thereof is 50.

After the product of the score and the priority is calculated, a total value is calculated for each mode. Then, the mode having the highest total value is adopted as the mode to be prioritized. In the example illustrated in FIG. 19, since the total value of the high quality mode among the three modes is the highest, the high quality mode is adopted as the mode to be prioritized. As a result, even if all of the print continuation mode, the high quality mode, and the drying performance mode are actually selected, the deceleration condition is determined assuming that the high quality mode is set.

<7.4 Example of Determining Speed Change Condition Using Machine Learning (Fifth Modification)>

In recent years, machine learning such as deep learning has been used in various fields. The speed change condition (deceleration condition and acceleration condition) can also be determined using machine learning. Therefore, an example of determining the deceleration rate using machine learning will be described as a fifth modification.

Figure 20:
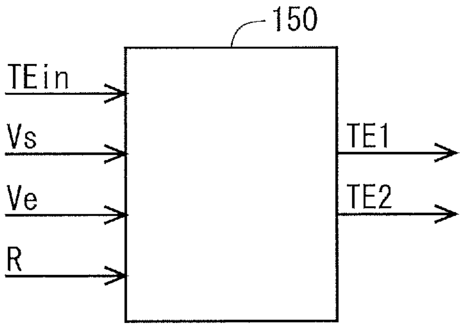
FIG. 20 is a diagram for explaining a neural network used in a fifth modification of the embodiment.

In the present modification, a temperature sensor is installed in the drying unit 25, and machine learning using information on a drying temperature obtained from the temperature sensor is performed. As a learning unit for performing the machine learning, a neural network 150 (see FIG. 20) is prepared in which a drying temperature TEin at a deceleration start time point, a conveyance speed Vs before deceleration, a conveyance speed Ve after deceleration, and a deceleration rate R are set as input data, and a drying temperature (predicted value) TE1 at a deceleration completion time point and a drying temperature (predicted value) TE2 after one minute from the deceleration completion time point are set as output data. As a type of the neural network 150, for example, a general forward propagation neural network or a convolution neural network can be adopted.

In order to enable the use of the neural network 150 as described above, it is necessary to store information on the drying temperature TEin at the deceleration start time point, the conveyance speed Vs before deceleration, the conveyance speed Ve after deceleration, the deceleration rate R, the drying temperature (actual measurement value) at the deceleration completion time point, and the drying temperature (actual measurement value) after one minute from the deceleration completion time point, for example, in a database every time the conveyance speed is decelerated. The reason why the information on the drying temperature (actual measurement value) after one minute from the deceleration completion time point is used in addition to the information on the drying temperature (actual measurement value) at the deceleration completion time point is that there is a case where the temperature change continues even if a desired drying temperature is reached at the deceleration completion time point, and the drying temperature is away from the desired drying temperature after the deceleration is completed.

Note that hereinafter, the predicted value of the drying temperature at the deceleration completion time point is referred to as a "first predicted temperature", the predicted value of the drying temperature after one minute from the deceleration completion time point is referred to as a "second predicted temperature", the actual measurement value of the drying temperature at the deceleration completion time point is referred to as a "first actually measured temperature", and the actual measurement value of the drying temperature after one minute from the deceleration completion time point is referred to as a "second actually measured temperature".

Figure 21:
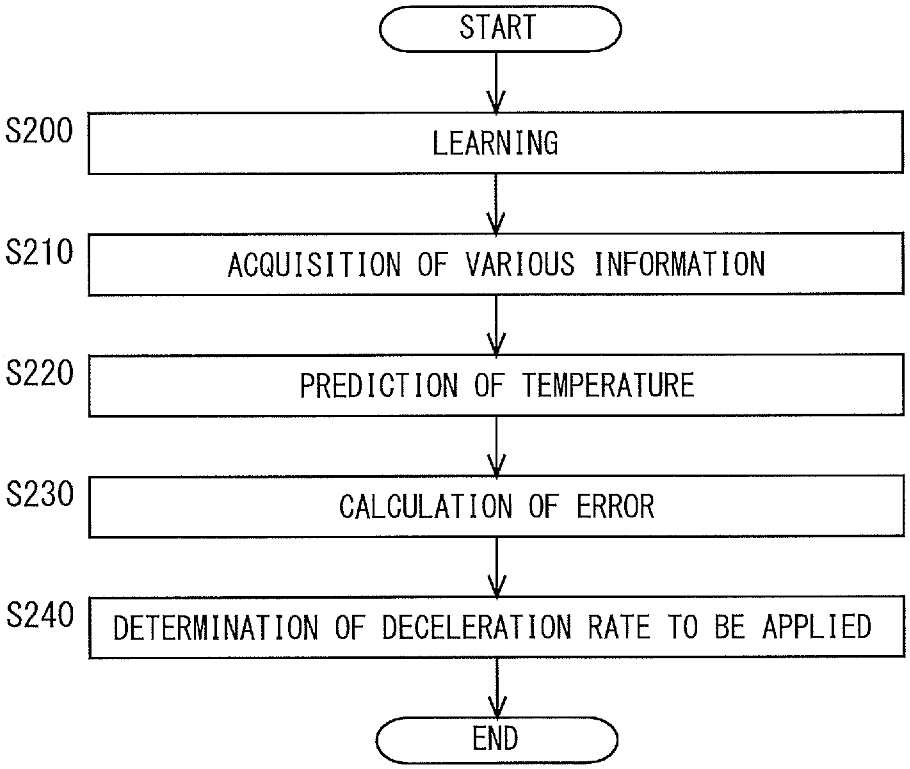
FIG. 21 is a flowchart showing a procedure of determining a deceleration rate in the fifth modification of the embodiment.
Figure 22:
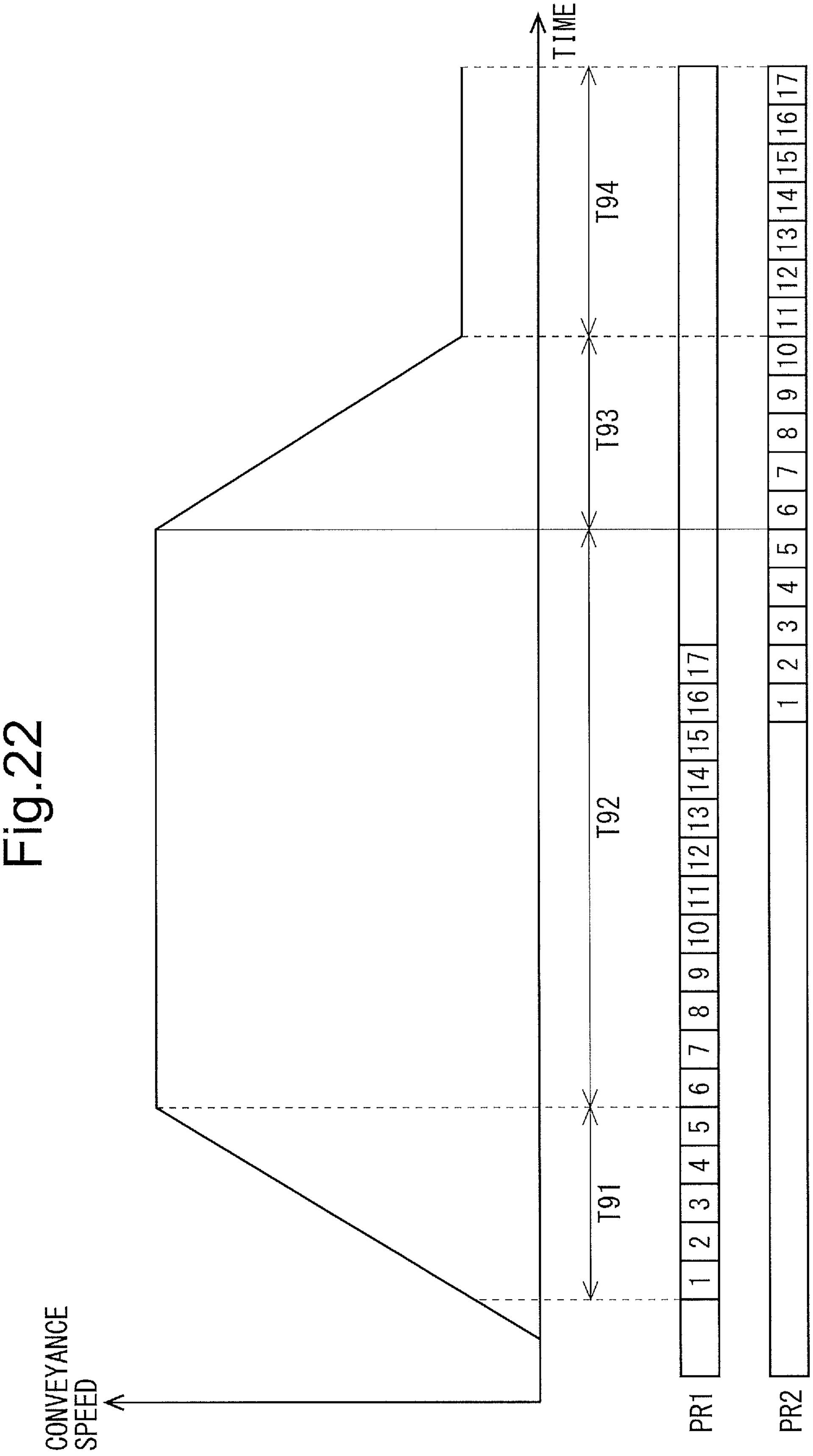
FIG. 22 is a diagram for explaining that sufficient quality cannot be obtained for low-speed printing or printing when acceleration/deceleration of a conveyance speed is performed in a conventional example.

FIG. 21 is a flowchart showing a procedure of determining the deceleration rate in the present modification. Note that processing performed when actually determining the deceleration rate among the processing of steps S200 to S240 shown in FIG. 21 is the processing of steps S210 to S240, and the processing of step S200 is processing performed in advance. When it is actually necessary to change the conveyance speed, the speed change condition determination unit 141 performs the processing of steps S210 to S240.

In step S200, learning of the neural network 150 is performed. At this time, the neural network 150 receives, as input data, the drying temperature TEin at the deceleration start time point, the conveyance speed Vs before deceleration, the conveyance speed Ve after deceleration, and the deceleration rate R. As a result, forward propagation processing is performed inside the neural network 150, and the first predicted temperature TEL and the second predicted temperature TE2 are outputted from the neural network 150. Then, the first and second actually measured temperatures corresponding to the input data are extracted from the database, and a sum of a "square error between the first predicted temperature TE1 and the first actually measured temperature" and a "square error between the second predicted temperature TE2 and the second actually measured temperature" (that is, a sum of squared errors) is obtained. Thereafter, parameters (weighting factor, bias) of the neural network 150 are updated by a back propagation method such that the sum of the square errors is minimized. By repeating such learning, the above parameters are optimized. As above, before the process of determining the deceleration rate is actually performed, the neural network 150 as a learning unit trained by machine learning with the deceleration condition and the like as input data is prepared.

Note that, regarding the learning method in step S200, batch learning in which all the teacher data (in this example, one set of teacher data includes the drying temperature TEin at the deceleration start time point, the conveyance speed Vs before deceleration, the conveyance speed Ve after deceleration, the deceleration rate R, the first actually measured temperature, and the second actually measured temperature) is collectively given to the neural network 150 may be adopted, mini-batch learning in which the teacher data is divided into a plurality of groups and the teacher data is given to the neural network 150 for each group may be adopted, or online learning in which the teacher data is given to the neural network 150 one by one may be adopted.

In step S210, information on the drying temperature TEin at the deceleration start time point, the conveyance speed Vs before deceleration, and the conveyance speed Ve after deceleration is acquired. Note that it is assumed that the conveyance speed Ve after deceleration is determined before this processing is performed. Furthermore, it is assumed that a target drying temperature (hereinafter, referred to as a "target temperature") after deceleration is set before this processing is performed.

In step S220, the drying temperature TEin at the deceleration start time point, the conveyance speed Vs before deceleration, and the conveyance speed Ve after deceleration, which are the information acquired in step S210, and the deceleration rate R are inputted to the neural network 150. In this regard, regarding the deceleration rate R, for example, values in increments of 5% are sequentially given within a range satisfying the constraint regarding the conveyance control. For example, values of 5% or more and 70% or less are given in increments of 5%. In this case, regarding the deceleration rate R, 14 values are sequentially inputted to the neural network 150. That is, a plurality of sets of input data representing the deceleration condition are given to the neural network 150. Then, the first and predicted temperature TE1 the second predicted temperature TE2 are outputted from the neural network 150 for one value of the deceleration rate R.

In step S230, a sum (hereinafter, referred to as a "temperature error" for convenience) of the "square error between the first predicted temperature TEL and the target temperature" and the "square error between the second predicted temperature TE2 and the target temperature" is obtained for each value of the deceleration rate R inputted to the neural network 150 in step S220. In the above example, 14 temperature errors are obtained.

In step S240, a value of the deceleration rate R at which the minimum temperature error among the temperature errors (in the above example, 14 temperature errors) obtained in step S230 is obtained is determined as the value of the deceleration rate to be actually applied. That is, a value of the deceleration rate corresponding to the input data when the output data closest to the target value (target temperature) is outputted from the neural network 150 is determined as the value of the deceleration rate to be actually applied.

According to the present modification, for example, in a case where it is desired to reduce the drying temperature from 100 degrees before deceleration to 60 degrees after deceleration, the deceleration rate is determined such that the drying temperature at the deceleration completion time point and the drying temperature after one minute from the deceleration completion time point are close to 60 degrees. As described above, also in the present modification, the deceleration rate when the conveyance speed is decelerated is determined in consideration of the state of the drying unit 25.

<7.5 Example in which Printing Apparatus Using UV Ink is Adopted (Sixth Modification)>

Although it is assumed that printing is performed using aqueous ink in the above embodiment, the present invention is not limited thereto. Therefore, an example in which a printing apparatus using UV ink (ultraviolet curing ink) such as a printing apparatus for label printing is adopted will be described as a sixth modification.

In the present modification, UV ink is ejected from each inkjet head configuring the inkjet head rows 24*c*, 24*m*, 24*y*, and 24*k* (see FIG. 2) in the printing unit 24. Furthermore, an ultraviolet irradiation unit that cures the UV ink on printed printing paper by ultraviolet irradiation is provided inside the printing mechanism instead of the drying unit 25. When the conveyance speed needs to be decelerated, the speed change condition determination unit 141 determines a deceleration rate and a conveyance speed after deceleration in consideration of at least one of a supply state of ink from the ink supply unit 29 to the printing unit 24 and a state of the ultraviolet irradiation unit. Similarly, when the conveyance speed needs to be accelerated, the speed change condition determination unit 141 determines an acceleration rate and a conveyance speed after acceleration in consideration of at least one of the supply state of ink from the ink supply unit 29 to the printing unit 24 and the state of the ultraviolet irradiation unit.

<8. Others>

The present invention is not limited to the above embodiment (including the modifications), and various modifications can be made without departing from the gist of the present invention. Furthermore, the above-described embodiment and the above-described modifications can be appropriately combined and implemented so as not to cause inconsistency.

DESCRIPTION OF REFERENCE CHARACTERS

1: PRINTING SYSTEM

10: PRINTING APPARATUS

24: PRINTING UNIT
25: DRYING UNIT
28: CONVEYANCE UNIT
29: INK SUPPLY UNIT
50: WEB BUFFER
52: POST-PROCESSING MACHINE GROUP
61 to 64: FIRST TO FOURTH TABLES
65: PRIORITY SETTING TABLE
100: PRINT CONTROL DEVICE
140: OVERALL CONTROL UNIT
141: SPEED CHANGE CONDITION DETERMINATION UNIT
142: CONVEYANCE CONTROL UNIT
143: INK SUPPLY CONTROL UNIT
144: PRINTING CONTROL UNIT
145: DRYING CONTROL UNIT
150: NEURAL NETWORK
200: PRINTING MACHINE BODY
P: PRINT CONTROL PROGRAM

The invention claimed is:

1. An image forming apparatus including a conveyance unit configured to convey a print medium having a long belt shape, and a printing unit configured to form an image by ejecting ink onto the print medium being conveyed by the conveyance unit, the image forming apparatus comprising:

a conveyance control unit configured to control an operation of the conveyance unit;

an ink supply unit configured to supply ink to the printing unit;

a drying unit configured to dry a printed print medium on which an image is formed by the printing unit; and a speed change condition determination unit configured to, when it is necessary to change a conveyance speed, determine a speed change condition including a speed change rate and a conveyance speed after speed change in consideration of at least one of a supply state of ink from the ink supply unit to the printing unit and a state of the drying unit, the conveyance speed being a distance that the print medium is conveyed per unit time by the conveyance unit, the speed change rate being an amount of change in the conveyance speed per unit time, wherein the conveyance control unit controls an operation of the conveyance unit in accordance with the speed change condition determined by the speed change condition determination unit.

2. The image forming apparatus according to claim 1, wherein the speed change condition determination unit considers the supply state of ink from the ink supply unit to the printing unit when determining the speed change rate and the conveyance speed after speed change.

3. The image forming apparatus according to claim 2, further comprising an ink supply control unit configured to control an ink supply rate indicating a supply degree of ink from the ink supply unit to the printing unit, wherein when the ink supply rate is within a predetermined range, the speed change condition determination unit determines the speed change rate to be a lower value as the ink supply rate is higher.

4. The image forming apparatus according to claim 3, wherein a second table storing a relationship between a combination of the ink supply rate and the speed change rate and a score is prepared in advance, and the speed change condition determination unit determines the speed change rate based on the second table.

5. The image forming apparatus according to claim 1, wherein the speed change condition determination unit considers the state of the drying unit when determining the speed change rate and the conveyance speed after speed change.

6. The image forming apparatus according to claim 5, wherein the drying unit includes a plurality of light sources that generate heat when turned on, and when a turn-on rate of the plurality of light sources is within a predetermined range, the speed change condition determination unit determines the speed change rate to be a lower value as the turn-on rate of the plurality of light sources is higher.

7. The image forming apparatus according to claim 6, wherein a first table storing a relationship between a combination of the turn-on rate of the plurality of light sources and the speed change rate and a score is prepared in advance, and the speed change condition determination unit determines the speed change rate based on the first table.

8. The image forming apparatus according to claim 1, wherein the speed change condition determination unit considers both the supply state of ink from the ink supply unit to the printing unit and the state of the drying unit when determining the speed change rate and the conveyance speed after speed change.

9. The image forming apparatus according to claim 8, wherein a high quality mode in which quality of the image on the printed print medium is emphasized and a drying performance mode in which a dry state of the printed print medium is emphasized are prepared, when the high quality mode is set, the speed change condition determination unit determines the speed change rate and the conveyance speed after speed change in consideration of the supply state of ink from the ink supply unit to the printing unit more preferentially than the state of the drying unit, and when the drying performance mode is set, the speed change condition determination unit determines the speed change rate and the conveyance speed after speed change in consideration of the state of the drying unit more preferentially than the supply state of ink from the ink supply unit to the printing unit.

10. The image forming apparatus according to claim 1, further comprising a learning unit trained by machine learning using the speed change condition as input data, wherein when it is necessary to change the conveyance speed, the speed change condition determination unit gives a plurality of sets of input data representing the speed change condition to the learning unit, and determines a speed change condition corresponding to input data when output data closest to a target value is outputted from the learning unit as a speed change condition to be actually applied.

11. The image forming apparatus according to claim 10, wherein a temperature of the drying unit is adopted as the target value, the input data further includes a temperature of the drying unit before speed change, and the learning unit outputs a predicted temperature of the drying unit after speed change as the output data.

12. The image forming apparatus according to claim 1, wherein the speed change condition determination unit further considers a constraint based on an operation of at least one of a conveyance source of the print medium and a conveyance destination of the printed print medium when determining the speed change rate and the conveyance speed after speed change.

13. The image forming apparatus according to claim 1, wherein the printing unit includes a print head that ejects ink onto the print medium, and the speed change condition determination unit further considers an ejection state of ink from the print head to the print medium when determining the speed change rate and the conveyance speed after speed change.

14. The image forming apparatus according to claim 1, configured to allow setting of one or a plurality of modes, wherein the speed change condition determination unit changes the speed change rate and the conveyance speed after speed change depending on the mode being set.

15. The image forming apparatus according to claim 1, wherein a high speed, a first low speed, and a second low speed that is a speed lower than the first low speed are prepared as a conveyance speed when the conveyance unit conveys the print medium at a constant speed, and the conveyance control unit is configured to be capable of performing deceleration from the high speed to the second low speed separately for a first deceleration from the high speed to the first low speed and a second deceleration from the first low speed to the second low speed.

16. The image forming apparatus according to claim 15, wherein the speed change condition determination unit determines a speed change rate for the second deceleration to be a value higher than a speed change rate for the first deceleration.

17. The image forming apparatus according to claim 15, wherein the conveyance control unit is configured to be capable of performing acceleration from the first low speed to the high speed without performing deceleration from the first low speed to the second low speed after the first deceleration.

18. An image forming apparatus including a conveyance unit configured to convey a print medium having a long belt shape, and a printing unit configured to form an image by ejecting photocurable ink onto the print medium being conveyed by the conveyance unit, the image forming apparatus comprising:

a conveyance control unit configured to control an operation of the conveyance unit;

an ink supply unit configured to supply photocurable ink to the printing unit;

an ultraviolet irradiation unit configured to, by ultraviolet irradiation, cure photocurable ink on a printed print medium on which an image is formed by the printing unit; and a speed change condition determination unit configured to, when it is necessary to change a conveyance speed, determine a speed change condition including a speed change rate and a conveyance speed after speed change in consideration of at least one of a supply state of photocurable ink from the ink supply unit to the printing unit and a state of the ultraviolet irradiation unit, the conveyance speed being a distance that the print medium is conveyed per unit time by the conveyance unit, the speed change rate being an amount of change in the conveyance speed per unit time, wherein the conveyance control unit controls an operation of the conveyance unit in accordance with the speed change condition determined by the speed change condition determination unit.

19. A method for controlling an image forming apparatus including a conveyance unit configured to convey a print medium having a long belt shape, a printing unit configured to form an image by ejecting ink onto the print medium being conveyed by the conveyance unit, an ink supply unit configured to supply ink to the printing unit, and a drying unit configured to dry a printed print medium on which an image is formed by the printing unit, the method comprising:

a speed change condition determination step of, when it is necessary to change a conveyance speed, determining a speed change condition including a speed change rate and a conveyance speed after speed change in consideration of at least one of a supply state of ink from the ink supply unit to the printing unit and a state of the drying unit; the conveyance speed being a distance that the print medium is conveyed per unit time by the conveyance unit, the speed change rate being an amount of change in the conveyance speed per unit time, and a conveyance control step of controlling an operation of the conveyance unit in accordance with the speed change condition determined in the speed change condition determination step.

* * * * *